(12) United States Patent
Verbowski et al.

(10) Patent No.: US 7,865,777 B2
(45) Date of Patent: Jan. 4, 2011

(54) THREAD INTERCEPTION AND ANALYSIS

(75) Inventors: Chad Verbowski, Redmond, WA (US); Brad Daniels, Redmond, WA (US); John Dunagan, Bellevue, WA (US); Shan Lu, Hefei (CN); Roussi Roussev, Melbourne, FL (US); Juhan Lee, Issaquah, WA (US); Arunvijay Kumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 490 days.

(21) Appl. No.: 11/932,890

(22) Filed: Oct. 31, 2007

(65) Prior Publication Data
US 2008/0059973 A1   Mar. 6, 2008

Related U.S. Application Data

(63) Continuation of application No. 11/567,113, filed on Dec. 5, 2006.

(60) Provisional application No. 60/807,564, filed on Jul. 17, 2006, provisional application No. 60/743,382, filed on Feb. 28, 2006.

(51) Int. Cl.
*G06F 11/00* (2006.01)

(52) U.S. Cl. .............. 714/37; 714/33; 714/34; 714/38; 714/45; 717/130

(58) Field of Classification Search .......... 714/15, 714/25, 33, 34, 37, 38, 45, 47, 49; 717/130
See application file for complete search history.

(56) References Cited

U.S. PATENT DOCUMENTS

| | | |
|---|---|---|
| 5,794,256 A | 8/1998 | Bennett et al. |
| 5,812,759 A | 9/1998 | Brooks |
| 5,862,386 A | 1/1999 | Joseph et al. |
| 6,560,725 B1 | 5/2003 | Longwell et al. |
| 6,681,230 B1 * | 1/2004 | Blott et al. ............... 707/104.1 |
| 6,748,556 B1 | 6/2004 | Storino et al. |

(Continued)

OTHER PUBLICATIONS

Dunagan, et al., "Towards a Self-Managing Software Patching Process Using Black-Box Persistent-State Manifests", retrieved on May 27, 2009 at <<http://research.microsoft.com/pubs/70046/tr-2004-23.pdf>>, Institute of Electrical and Electronics Engineers, Inc., 2004, 10 pgs.

(Continued)

*Primary Examiner*—Robert Beausoliel
*Assistant Examiner*—Joseph D Manoskey
(74) *Attorney, Agent, or Firm*—Lee & Hayes, PLLC

(57) ABSTRACT

Apparatus and methods for intercepting and analyzing threads are disclosed. In one embodiment, a thread data recorder is configured to instrument one or more existing functions by modifying computer executable instructions in the functions to intercept threads calling the functions. In one possible implementation, the number of existing functions instrumented can be reduced by instrumenting choke point functions. The instrumented functions can also capture data associated with the threads as the threads execute at the function. This data can be saved to memory and compressed into logs. In one aspect, the data can be saved and/or compressed at a time when processor resources are being used at or below predetermined level. The captured data can be used to analyze a functioning of a computer system in which the threads were produced.

17 Claims, 17 Drawing Sheets

U.S. PATENT DOCUMENTS

| | | | |
|---|---|---|---|
| 6,820,218 | B1 | 11/2004 | Barga et al. |
| 6,854,054 | B1 | 2/2005 | Kavanagh |
| 7,047,521 | B2 | 5/2006 | Bunnell |
| 7,191,364 | B2 | 3/2007 | Hudson et al. |
| 7,386,839 | B1 | 6/2008 | Golender et al. |
| 7,461,043 | B2 * | 12/2008 | Hess .......................... 706/46 |
| 2002/0073063 | A1 | 6/2002 | Faraj |
| 2002/0199172 | A1 | 12/2002 | Bunnell |
| 2003/0056200 | A1 | 3/2003 | Li et al. |
| 2004/0117763 | A1 | 6/2004 | Fjallstrom et al. |
| 2004/0139434 | A1 | 7/2004 | Blythe et al. |
| 2004/0153847 | A1 | 8/2004 | Apte et al. |
| 2004/0163077 | A1 | 8/2004 | Dimpsey et al. |
| 2004/0177141 | A1 | 9/2004 | Foody et al. |
| 2005/0010812 | A1 | 1/2005 | Terrell et al. |
| 2005/0026486 | A1 | 2/2005 | Thomas |
| 2005/0108562 | A1 | 5/2005 | Khazan et al. |
| 2005/0183090 | A1 | 8/2005 | Hunt |
| 2005/0268112 | A1 | 12/2005 | Wang et al. |
| 2005/0273667 | A1 | 12/2005 | Shrivastava et al. |
| 2006/0041665 | A1 | 2/2006 | Karnik et al. |
| 2007/0055766 | A1 * | 3/2007 | Petropoulakis et al. ...... 709/224 |

OTHER PUBLICATIONS

Lomet, D.B., "Persistent Applications Using Generalized Redo Recovery", In Proceedings of the 14th International Conference on Data Engineering, IEEE, Feb. 23-27, 1998, pp. 154-163.

Wang, et al., "Strider: A Black-box, State-based Approach to Change and Configuration Management and Support", USENIX, LISA 2003 Technical Paper, retrieved on May, 2009 at <<http://www.usenix.org/events/lisa2003/tech/wang/wang_html/>> 2003, 23 pgs.

Hunt, et al., "Intercepting and Instrumenting COM Applications", 5th USENIX Conference on Object-Oriented Technologies and Systems, retrieved from the internet on Jan. 22, 2010: <<http://www.usenix.org/events/coots00/full_papers/hunt/hunt.pdf>>, May 7, 1999, 13 pgs.

Li, "Monitoring of Component-Based Systems", May 28, 2003, retrieved from the internet on Jan. 22, 2010 <<http://www.hpl.hp.com/techreports/2002/HPL-2002-25R1.pdf>> 27 pgs.

Prasad, et al., "Locating System Problems Using Dynamic Instrumentation", Proceedings of the Linux Symposium, Ottawa, Ontario, Canada, Jul. 23, 2005, retrieved from the internet on Jan. 22, 2010 <<http://www.linuxinsight.com/files/ols2005/prasad-reprint.pdf>> 18 pgs.

* cited by examiner

US 7,865,777 B2

THREAD INTERCEPTION AND ANALYSIS

RELATED PATENT APPLICATIONS

This U.S. Patent Application claims the benefit of priority from, and hereby incorporates by reference the entire disclosure of, co-pending U.S. Provisional Application for Letters Patent Ser. No. 60/743,382 filed Feb. 28, 2006, and titled "Software Activity Systems Management".

This U.S. Patent Application further claims the benefit of priority from, and hereby incorporates by reference the entire disclosure of, co-pending U.S. Provisional Application for Letters Patent Ser. No. 60/807,564 filed Jul. 17, 2006, and titled "Always-On Tracing and Scalable Analysis of Persistent State Interactions".

This U.S. Patent Application further claims the benefit of priority from, and hereby incorporates by reference the entire disclosure of, co-pending U.S. application for Letters patent Ser. No. 11/567,113 filed Dec. 5, 2006, and titled "Thread Interception and Analysis".

BACKGROUND

A primary challenge to building a reliable and secure computer system is managing a persistent state (PS) of the system, which includes all the executable files, configuration settings, and other data that govern how the system functions. Misconfigurations and other PS problems are among the primary causes of failures and security vulnerabilities across a variety of systems ranging from individual desktop machines to large-scale Internet services. PS problems, along with problems caused by failures in system elements such as hardware components and programming logic, can deleteriously affect the entire system.

The cost of not effectively managing a system's PS is high. For example, PS problems can reproduce themselves after a system reboot or an application restart. In such a scenario, if known problem identification fails, and if a subsequent system reboot/application restart fails to remedy the PS problem, there may be no choice but to manually examine the system to identify a root cause item in the PS.

Manual investigation of a system to identify a root cause item in the PS is difficult and expensive due to the large number of potential problems. For example, a potential set of items that can impact an application having trouble is huge, and correspondingly a potential root cause list can include a complete set of items on the system.

SUMMARY

This summary is provided to introduce simplified concepts relating to thread interception and analysis which are further described below in the detailed description. This summary is not intended to identify essential features of the claimed subject matter, nor is it intended for use in determining the scope of the claimed subject matter.

Apparatus and methods for intercepting and analyzing threads are disclosed. In one embodiment, a thread data recorder is configured to instrument one or more existing functions by modifying computer executable instructions in the functions to intercept threads calling the functions. In one possible implementation, the number of existing functions instrumented can be reduced by instrumenting choke point functions.

The instrumented functions can also capture data associated with the threads as the threads execute at the function. This data can be saved to memory and compressed into logs. In one aspect, the data can be saved and/or compressed at a time when processor resources are being used at or below a predetermined level. The captured data can be used to analyze a functioning of a computer system in which the threads were used.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Thread interception and analysis is described in which embodiments provide for the analysis of a functioning of a computer system through collection of data from program execution threads. Program execution threads can include any thread in a system that executes code from a given program.

A thread can include a path of execution on a processor, and threads can be associated with hardware, paths of execution in hypervisors from a virtual machine (VM) implementation, single threaded systems (such as legacy Unix OSs), multi-threaded OS, and so on. In one exemplary implementation, a program thread, or a thread owned by an OS itself, may execute code from another program. Collection and/or tracking of a thread may be conducted regardless of the owner or creator or the thread.

In one implementation, select functions in one or more operational layers of a system are instrumented to include computer readable instructions which instigate interception of threads calling the select functions. The computer readable instructions can also instigate collection of data associated with the threads calling the functions. This data can include details of processes/programs associated with the threads, users associated with the threads, timestamps associated with the threads, interactions associated with the threads, the state of the overall system, and so on.

The data can be used for several purposes. For example, data associated with the threads can be examined to verify that interactions being instigated by the threads are legal according to a set policy. In another implementation, the data collected can be compressed, stored, and later analyzed to isolate possible causes of errant behavior or malfunctions in the computer system.

In another possible embodiment, the collected data can be analyzed by grouping a collection of related interactions into an activity burst and comparing activity bursts associated with similar attributes. In one implementation, activity bursts associated with similar interactions can be compared with activity bursts associated with the collected data. In yet another implementation, activity bursts associated with the collected data can also be compared with interactions that are specific to one or more users. Similarly, in another possible implementation a signature can be assigned to activity bursts associated with unwarranted interactions, enabling a computer system to quickly recognize and prohibit such interactions. Moreover, activity bursts can be used to identify clusters of related activity along any dimensions, including time, users, programs, and so on.

While aspects of described systems and methods for thread interception and analysis can be implemented in any number of different computing systems, environments, and/or configurations, embodiments of thread interception and analysis are described in the context of the following exemplary system architecture(s).

An Exemplary System

Figure 1:
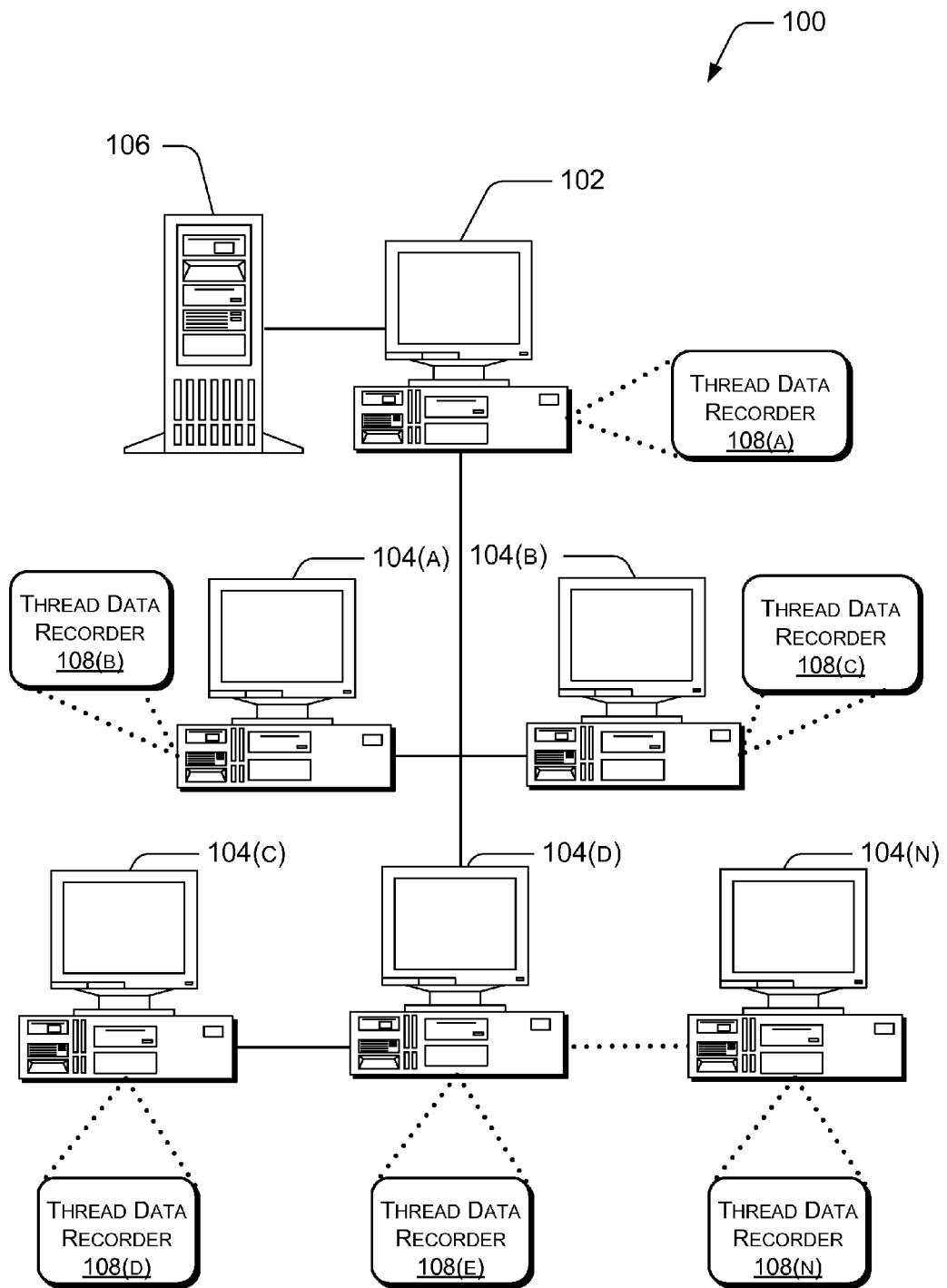
FIG. 1 illustrates an exemplary network environment in which one or more threads are generated.

FIG. 1 illustrates an exemplary computer system 100 in which threads can be intercepted and analyzed. Computer system 100 includes a central computing-based device 102, other computing-based devices 104(a)-(n), and a collection server 106. Central computing-based device 102, computing-based devices 104(a)-(n), and collection server 106 can include personal computers (PCs), web servers, email servers, home entertainment devices, game consoles, set top boxes, and any other computing-based device known in the art.

Moreover, computer system 100 can include any number of computing-based devices 102, 104(a)-(n). For example, in one implementation, computer system 100 can be a company network, including thousands of office PCs, various servers, and other computing-based devices spread throughout several countries. Alternately, in another possible implementation, system 100 can include a home network with a limited number of PCs belonging to a single family.

Computing-based devices 102, 104(a)-(n) can be coupled to each other in various combinations through a wired and/or wireless network, including a LAN, WAN, or any other networking technology known in the art.

Computing-based devices 102, 104(a)-(n) can also include thread data recorders 108(a)-(n) respectively, capable of instrumenting functions in system 100 to intercept threads. Instrumenting functions can include modifying, adding and/or deleting computer readable instructions in the functions to intercept threads calling the functions. In one possible implementation, instrumenting functions also includes modifying, adding and/or deleting computer readable instructions in the functions to require the thread to execute computer readable instructions in the functions that enable the capture of data associated with the thread, including a program with which the thread is associated, one or more interactions associated with the thread, a user of the program with which the thread is associated, a time stamp associated with each interaction in a thread, and so on.

In still another implementation, thread data recorders 108(a)-(n) can also be used to monitor code interpreted by a Virtual Machine (VM). A VM includes programmable functions that interpret code being run on the VM instead of sending the code for execution to one or more processors. Code interpreted by a VM can be monitored by thread data recorders 108(a)-(n) to identify functions to be intercepted. At interception time, thread data recorders 108(a)-(n) can examine and/or record a state of a system running on the VM. This examination and recording may be equivalent to a binary modification of the code. The binary modification may become part of the VM instead of requiring changes to any running software.

The instrumented functions can include any functions that might be called by a program/process. In one implementation, the instrumented functions can include low level choke point functions, such as file system drivers, registry functions, functions creating new processes and/or services, etc.

Data captured from threads can be stored and/or processed to regulate the behavior of system 100, and to investigate a condition of system 100. Types of data which can be captured from threads by thread data recorders 108(a)-(n), and the operation of thread data recorders 108(a)-(n) will be discussed in more detail in conjunction with FIG. 2 below.

In exemplary computer system 100 each of computing-based devices 102, 104(a)-(n) includes a thread data recorder 108. It will be understood, however, that thread data recorders 108(a)-(n) can be included on any combination of computing-based devices 102, 104(a)-(n). For example, in one implementation, a single computing-based device 102, 104(a)-(n) in computing system 100 can include a thread data recorder 108. Alternately, in another possible implementation, several selected computing-based devices 102, 104(a)-(n) can include thread data recorders 108.

Data captured from functions can be processed within thread data recorder 108, or it can be transmitted to another device, such as collection server 106 for retention, processing and/or analysis. The operation of collection server 106 will be discussed in more detail below in conjunction with FIG. 6. FIG. 1 illustrates that collection server 106 is coupled to computing-based device 102. It will also be understood, however, that collection server 106 can be coupled to one or more of computing-based devices 104(a)-(n). Moreover, other collection servers 106 may exist in computer system 100, with any combination of computing-based devices 102, 104 (a)-(n) being coupled to the one or more collection servers 106.

Additionally, it will be understood that computing-based devices 102, 104(a)-(n) may be coupled to one or more collection servers 106 through other computing-based devices 102, 104(a)-(n). For example, in one exemplary implementation, data received by thread data recorder 108(b) can be transmitted via computing-based device 102, to collection server 106 where the data may be collected. In a similar manner, data from thread data recorders 108(c)-(n) can be transmitted to, and collected at, collection server 106.

Figure 2:
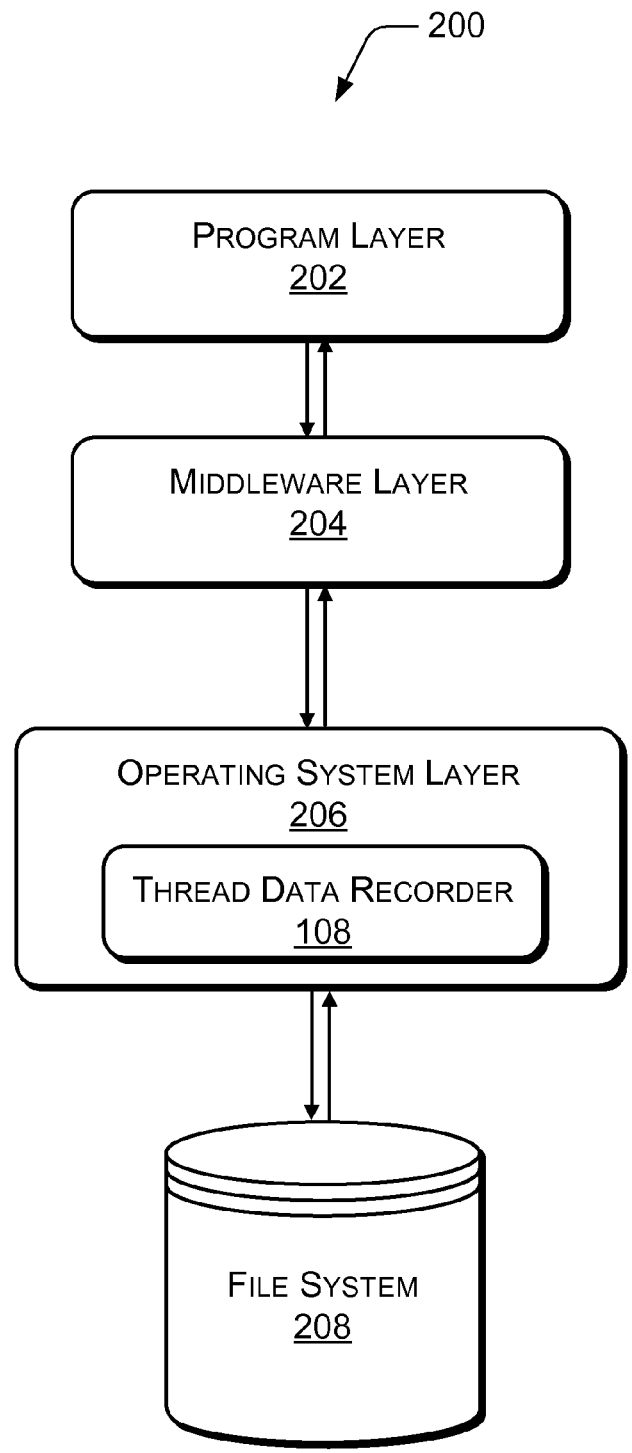
FIG. 2 illustrates an exemplary architecture for intercepting threads and capturing data associated with the threads.

FIG. 2 illustrates an exemplary architecture 200 of various operational layers in one or more of computing-based devices 102, 104(a)-(n). The operational layers need not be directly related to the functionality of a program being executed by one or more of computing-based devices 102, 104(a)-(n). Rather, the operational layers serve only as an illustration to indicate various stages that are involved in thread interception. The layers in consideration can be separate logical or physical platforms implemented through software or physical hardware.

Architecture 200 includes a program layer 202, a middleware layer 204 and an operating system layer 206. In the exemplary implementation of architecture 200 shown, thread data recorder 108 operates within operating system layer 206. It will also be understood, however, that thread data recorder 108 can exist in other layers in architecture 200. For example, thread data recorder 108 can exist in one or more of layers 202, 204, 206 at different times. Additionally, thread data recorder 108 can exist in one or more of layers 202, 204, 206 simultaneously. In this way interception of threads can be done at any layer 202, 204, 206. In yet another implementation, operating system layer 206 can also run in a Virtual Machine (VM) allowing the capture of data in an operational layer associated with the VM. In such a scenario, this operational layer associated with the VM may be in addition to layers 202, 204 and 206.

In one exemplary implementation, thread data recorder 108 captures data associated with interactions between one or more programs (such as an application, an operating system, and so on) and a file system 208 by intercepting threads from the one or more programs. File system 208 can include, for example, files such as data files, executable files and settings information (such as configuration settings), and so on.

As discussed above in conjunction with FIG. 1, each of computing-based devices 102, 104(a)-(n) can include thread data recorder 108. Alternately, thread data recorders 108 can be included on any combination of computing-based devices 102, 104(a)-(n).

Program layer 202 can include one or more programs, such as applications, running in architecture 200. Program layer 202 provides a platform for the one or more programs to interact between themselves and also perform common application services associated with application processes. Some possible examples of applications that may run on program layer 202 include word processing applications, spreadsheet applications, mail applications, etc.

The one or more programs running on program layer 202 can interact with data and/or settings in file system 208 during the execution of one or more operations. Possible examples of operations or interactions include read, write and execute operations performed on file system 208 including changes in files and registry settings in file system 208.

Interactions between program layer 202, middleware layer 204, operating system 206 and file system 208 occur through threads generated by programs running within program layer 202. Every program, performing one or more tasks, has at least one thread that is generated as a result of its execution, such as a thread associated with a program's MAIN function. Threads allow a program to split itself into two or more simultaneously running tasks. These tasks, for example, can be associated with the execution of a program generating the thread. Alternately, the tasks can be associated with communication between the program and other applications in which an interaction with file system 208 results (such as when a configuration setting is changed).

It will be understood that information associated with any threads in a system, such as system 100, can be captured. For example, information associated with the execution of threads generated at any of the operational layers can be intercepted and collected for future analysis. This can include, for example, threads associated with an operating system calling into code for a program.

Individual threads can be indicative of individual interactions between the one or more programs and file system 208. Each thread carries with it data defining attributes that are unique to that interaction. For example, attributes can include an identity of a program initiating the interaction, a stack of nested functions in a current functional sequence, and so on. For each interaction with file system 208, the thread generated in program layer 202 is transmitted through middleware layer 204 to operating system layer 206.

Middleware layer 204 includes computer software called middleware, which connects software components and/or programs running in program layer 202 to operating system layer 206. Middleware layer 204 provides an intervening operational layer between program layer 202 and operating system layer 206, and middleware can support complex, distributed applications. Some possible examples of middleware include web servers, application servers, content management systems, and similar tools supporting application development, delivery and so on.

Operating system layer 206 acts as an interface between a program and data and/or settings in file system 208. Operating system layer 206 can also oversee any interactions with the data and/or settings in file system 208. Moreover, operating system layer 206 can provide a runtime environment for the execution of one or more programs running in program layer 202.

As noted above, operating system layer 206 also can include thread data recorder 108. Thread data recorder 108 is configured to effect the interception of threads associated with interactions between one or more programs running on program layer 202 and file system 208. Thread data recorder 108 can also be configured to effect the capture of information associated with the threads.

For example, in one implementation, upon initialization of system 100, thread data recorder 108 instruments select functions running on system 100 to intercept threads calling the functions. The functions can also be instrumented to capture data associated with the threads, including: an identity of a program in program layer 202 with which each thread is associated, interactions associated with each thread, a user of a program with which each thread is associated, a time stamp associated with each interaction in a thread, and so on. In one possible implementation, data captured by thread data recorder 108 in operating system layer 206, is in a programmable language that is native to operating system layer 206. In yet another implementation, information associated with the execution of threads generated at any of the operational layers can be intercepted and collected for future analysis. In another possible implementation, thread data recorder 108 can also capture data associated with the execution of program code on a VM.

Thread data recorder 108 can also instrument functions running in any layer 202, 204, 206 to intercept threads calling the functions and capture data from the threads. For example, to trace persistent state (PS) interactions, functions in the lowest layer involved in retrieving and setting PS can be instrumented. In FIG. 2, the lowest layer is illustrated as operating system layer 206. It is also possible, however, for the lowest layer to include layers such as a virtual machine layer, which could be implemented in hardware, software, firmware, etc.

Intercepting threads calling functions at the lowest level or layer enables coverage of all program threads running in system 100. Moreover, functions to be instrumented in the lowest layer can be chosen from among choke point functions which are routinely relied on by other functions—such as file system functions, registry functions, functions creating new processes or services, and so on. In this way, the number of functions which must be instrumented can be reduced.

Alternately, functions in higher layers 204, 202 can be instrumented by thread data recorder 108. For example, if it is desired to track which web browsers are visiting which web sites, functions in higher levels called by the threads can be instrumented. For instance, by instrumenting functions in program layer 202, data including a URL and a window requested by a web browser can be captured from a thread associated with the web browser.

In contrast, at lower layers, such as operating system layer 206, there is less context available than at higher layers, such as layers 202, 204. As a result it may be more difficult to reconstruct logical high level interactions, such as user intentions, by intercepting threads from lower layers.

For example, threads intercepted at lower layers—such as IP packets being sent or received by a device such as a computer—may not provide enough information to deduce that a web browser is opening a URL. This results because the context that these packets are all related to an HTTP stream of data for a web browser may not be available. Without such contextual information, it may be difficult to establish a relationship between actions of a system—such as the sending of specific IP packets to a destination at a given time—with a user of a web browser.

Figure 3:
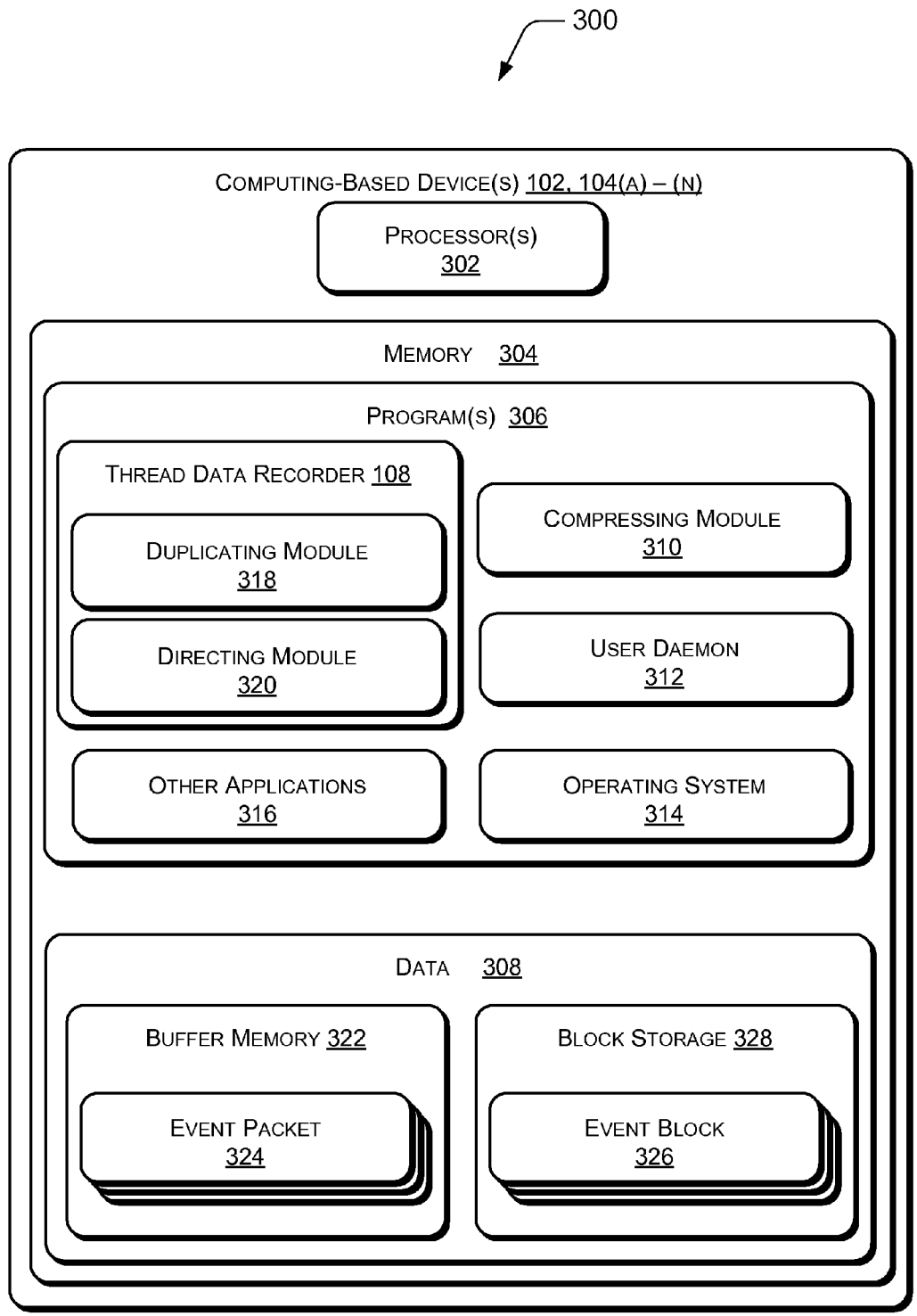
FIG. 3 illustrates an exemplary computing-based device for intercepting threads and capturing data associated with the threads.

FIG. 3 illustrates an exemplary architecture 300 of at least one of computing-based devices 102, 104(*a*)-(*n*). Architecture 300 includes one or more processor(s) 302 and a memory 304. Processor(s) 302 include, for example, microprocessors, microcomputers, microcontrollers, digital signal processors, central processing units, state machines, logic circuitries, and/or any devices that manipulate signals based on operational instructions. Among other capabilities, processor(s) 302 are configured to fetch and execute computer-readable instructions stored in memory 304.

Memory 304 can include any computer-readable medium known in the art including, for example, volatile memory (e.g., RAM) and/or non-volatile memory (e.g., flash, etc.). As illustrated in FIG. 3, memory 304 also can include program(s) 306 and data 308. Program(s) 306 include, for example, thread data recorder 108, a compressing module 310, a user daemon 312, an operating system 314, and other application (s) 316 such as word processor applications, spreadsheet applications, and so on.

As discussed above in conjunction with FIG. 2, thread data recorder 108 instruments selected functions and captures data from intercepted threads calling the instrumented functions in one or more operational layers 202, 204, 206. The captured data can be used to analyze a functioning of a computer system of which computing-based devices 102, 104(*a*)-(*n*) are a part. In another possible implementation, thread data recorder 108 can also capture data associated with the execution of a program code on a VM.

Thread data recorder 108 includes a duplicating module 318 and a directing module 320. In one implementation, thread data recorder 108 instruments an existing function by hooking into the function. In one exemplary aspect, duplicating module 318 is hooked into the existing function. Duplicating model 318 can include computer readable instructions which are executed by a calling thread as the thread executes at the function. The computer readable instructions associated with duplicating module 318 can also copy data to a shared memory as an event.

For example, once a thread calls an instrumented function and the thread is intercepted by the instrumented function, data associated with the thread can be captured and duplicated by duplicating module 318. Data associated with the thread can include data characterizing an interaction between the thread and the function, or data associated with an action which generated the thread. For instance, the data can characterize an interaction associated with the thread, a state of system 100 at the time the function is called, etc. The data can also be information related to a file, string, memory location, filename associated with a file, user ID, thread ID, interaction type, program generating the thread, time of execution of an interaction, time of completion of an interaction, and so on.

Thread data recorder 108 can store the captured and/or duplicated data in a buffer memory 322 as event packets 324. Buffer memory 322 can include any computer-readable medium known in the art including, for example, volatile memory (e.g., RAM) or non-volatile memory (e.g., flash and other types of memory known in the art) or a combination thereof. Though shown as residing in data 308, it will also be understood that buffer memory 322 can reside outside of data 308, such as in memory 304. Additionally, in one implementation, buffer memory 322 can be located externally from computing-based devices 102, 104(*a*)-(*n*).

In one possible implementation, copied data lacking attributes providing identification, such as a filename, can be associated with a unique identifier by thread data recorder 108. Such unique identifiers can include, for example, handles. For instance, events lacking attributes providing for identification of the events can be fixed up by identifying other events with the same handle from the same thread, and then copying a name associated with the handle to the event missing the attributes.

Directing module 320 in thread data recorder 108 directs user daemon 312 to implement compression of event packets 324 collected in buffer memory 322. To this end, user daemon 312 directs compressing module 310 to compress event packets 324 into an event block 326 which can be stored in block storage 328. Block storage 328 can include one or more event blocks 326.

User daemon 312 is a process that is neither started nor ended through direct intervention of a user. In one implementation, user daemon 312 is a service. In another implementation, user daemon 312 can be included within the programmable instructions of a Virtual Machine (VM) and its associated operational layer. In yet another implementation user daemon 312 can be implemented in the kernel of an operating system, such as operating system 314.

User daemon 312 can be programmed to implement compression of event packets 324 after a certain memory capacity of buffer memory 322 has been reached. In another implementation, user daemon 312 can be programmed to periodically implement compression of event packets 324. In yet another possible implementation, user daemon 312 can implement compression of event packets 324 in buffer memory 322 into one or more event blocks 326 of a predetermined size.

In yet another possible implementation, user daemon 312 can periodically implement the transmission of event blocks 326 to collection server 106. In still another possible implementation, user daemon 312 may be located externally from computing-based devices 102, 104(*a*)-(*n*). For example, the externally placed user daemon 312 can be included within programmable instructions of a Virtual Machine (VM) and its associated operational layer.

User daemon 312 may also, for example, manage its own operation as per inputs provided by either or all of thread data recorder 108, collection server 106, etc. Additionally, user daemon 312 can be configured to perform any or all of its functions at moments when processing resources are not being used by other programs, or when processing resources are being used at or below a predefined level of activity. Moreover, user daemon 312 can be configured to perform any or all of its functions on one or more specific processors. In one implementation this could include one or more specific processors dedicated to user daemon 312.

Thread data recorder 108 can prepare event blocks 326 stored in block storage 328 by grouping event packets 324 into event blocks 326 on the basis of like or similar attributes in event packets 324. For example, event blocks 326 can be formed which include all event packets 324 in buffer memory 322 associated with a particular word processing program. Alternately, in another possible implementation, event blocks 326 can be formed, which include all event packets 324 in buffer memory 322 associated with a particular user ID.

Event blocks 326 are discrete units including information associated with threads intercepted at instrumented functions. This information associated with threads can include information related to the functioning of system 100.

In one possible implementation, information associated with threads is organized in block storage 328 to implement a searchable collection of the information. A searchable collection of such information—such as an organized collection of event blocks 326—can be called a log. The structure of event blocks 326 and block storage 328 will be explained in greater detail in conjunction with FIGS. 4 and 5 below.

Additionally, though FIG. 3 illustrates thread data recorder 108 as including duplicating module 108, and directing module 320, it is also possible for thread data recorder 318 to include other programs and elements, such as compressing module 310, and user daemon 312. Moreover, thread data recorder 108 may reside within other programs in programs 306. For example, in one possible implementation, thread data recorder 108 may be a part of operating system 314.

Figure 4:
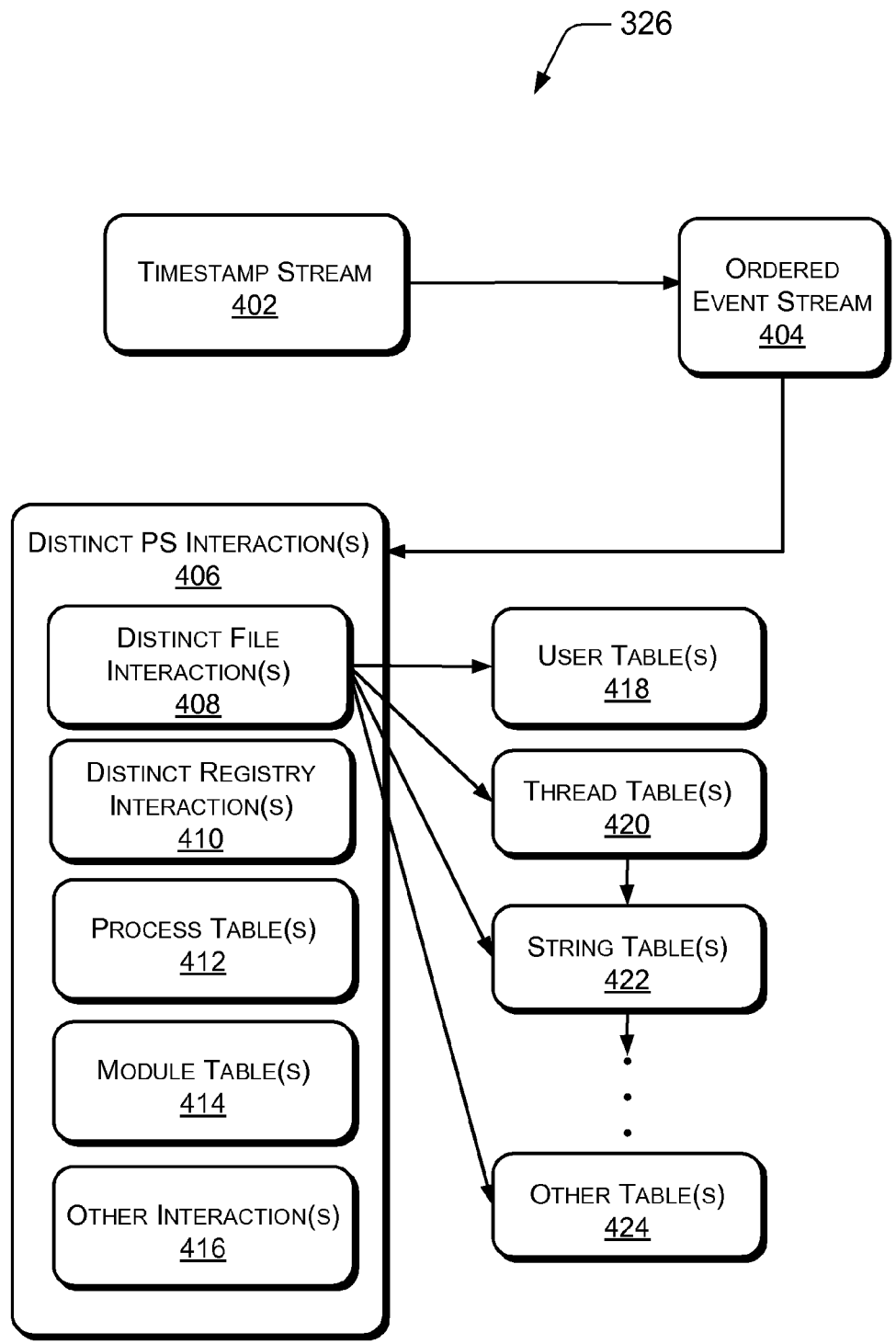
FIG. 4 illustrates an exemplary logical representation of an event block.

In FIG. 4 an exemplary logical representation of an event block 326 stored in block storage 328 is illustrated. The format of event blocks 326 may be guided by many considerations. For example, in one exemplary implementation, threads may be represented as traces of events. Traces of events include event information represented in two or more parallel, but connected, streams of data.

In the exemplary logical representation given in FIG. 4, event information in event blocks 326 is represented by a timestamp stream 402 and an ordered event stream 404. Timestamp stream 402 can include information relating to groups of interactions, times at which events under consideration took place, and so on. For example, information included in timestamp stream 402 can include, for example, a time when threads associated with the event information in block 326 were generated, start and end times when the event associated with the event information in block 326 took place, and so on.

In one implementation, times at which events under consideration took place are represented as a table of event IDs, where each event ID is an identifier for the distinct file, registry, module, process events, and so on. These event IDs are arranged in the manner in which they are received. In another implementation, the events can be arranged on the basis of other entities for example, timestamp, offset of a first event with a timestamp, offset of a last event with this timestamp, and so on. The manner in which events are arranged is further discussed in conjunction with FIG. 5.

Ordered event stream 404 in event block 326 includes event information intercepted and duplicated by any of thread data recorders 108. Event information can include information relating to a nature of an interaction, an application which initiated the interaction, and so on.

Event information in ordered event stream 404 can be normalized into one or more sections of distinct persistent state (PS) interaction(s) 406 such as distinct file interaction(s) 408, distinct registry interaction(s) 410, process table(s) 412, module table(s) 414, and other interaction(s) 416. In this way event information in persistent state (PS) interaction(s) 406 can be organized or arranged in sub-divisions on the basis of certain attributes. Each type of interaction 408-416 in distinct PS interaction(s) 406 can be mapped to a section in a log file, such as event block 326, block storage 328 or a combination thereof. Mapping and normalization of event information such as that included in distinct PS interaction(s) 406 can be accomplished using any procedure known in the art.

Process table(s) 412 can be used to track processes, including a path to an executable that started a process (and perhaps also a hash of the executable), and a start and an end time of the process. Process table(s) 412 can be internal OS data structures used to manage running processes and threads. Moreover, information about the creation of the processes, such as a start time, command line, path to an execution file, user context of the process, and privileges of the running process can be stored in process table(s) 412. In one implementation, process table(s) 412 can include information describing attributes associated with an event in consideration. The information may include, for example, a time of creation, a user context, an image name (stored as a string), a command line affecting the event, various handle information to further describe system context at the time of occurrence of the event, and so on.

Module table(s) 414 can include information defining one or more settings associated with a program module resulting in an event in consideration. Such information can include, for example, a file name string stored in a string table, timestamp information, a user context, reference to a thread/process responsible for loading the program module, a path to the program module in memory (and/or a hash of the executable), and so on.

In one implementation, process table(s) 412 and module table(s) 414 record events and use normalization similar to registry table(s) 408 or file table(s) 410. In one implementation, process table(s) 412 and module table(s) 414 record distinct events.

Distinct file interaction(s) 408 include, for example, information related to one or more interactions that have occurred with file system 208. Such interactions may include one or more read and/or write processes to file system 208 from one or more applications running on program layer 202. Examples of information related to distinct file interaction(s) 408 include path names of files, filenames, whether the interaction is with a file or a directory, numbers of bytes read and/or written, and so on. In yet another implementation, distinct file interaction(s) 408 further include sub-sections with data arranged according to event information such as distinct names, user context, process information, file data hashes, and values. Examples of sub-sections in distinct file interaction(s) 408 include user table(s) 418, thread table(s) 420, string table(s) 422, other table(s) 424, etc.

Distinct registry interaction(s) 410 include information indicating additions or deletions to registry settings of computer-based applications running on any one of computing-based devices 102, 104(a)-(n). Examples of distinct registry interaction(s) 410 can include information indicating changes in registry settings, such as a name of a registry, a location of the registry, data in the registry, and so on. Other types of interactions 416 include information associated with various other activities, for example execution of certain files, and so on.

Figure 5:
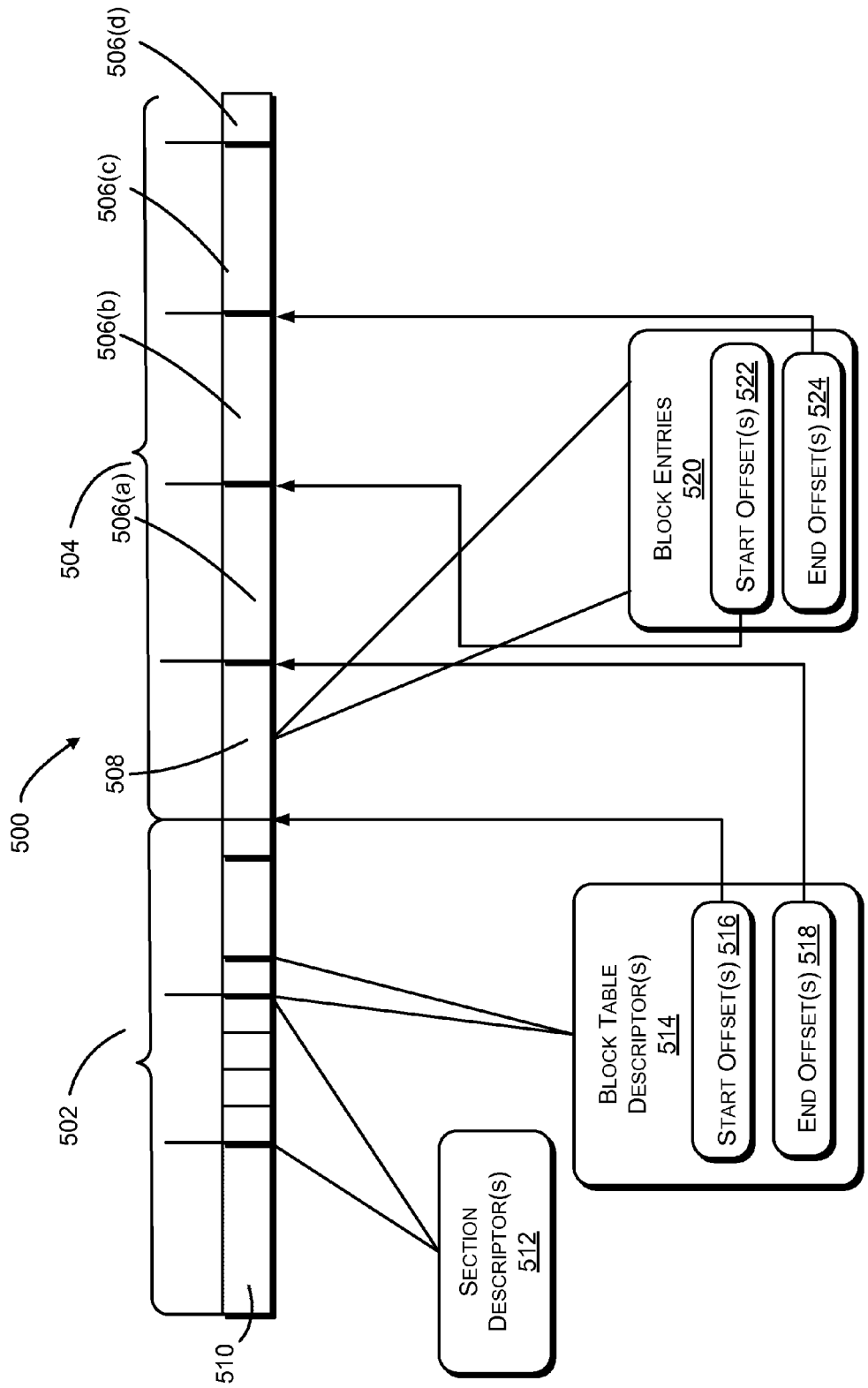
FIG. 5 illustrates an exemplary physical representation of an event block collection.

FIG. 5 illustrates an exemplary physical layout of an event block collection 500. Event block collection 500 can be created by associating one or more event blocks 326 found in block storage 328. In one implementation, one or more event blocks 326 are compressed to form event block collection 500.

Event block collection 500 may be created by user daemon 312, compressing module 310, collection server 106 or any combination thereof. Moreover, event block collection 500 may be created in response to several stimuli. For example, event block collection 500 may be created once a certain amount of block storage 328 is filled. Alternately, in another possible implementation, event block collection 500 may be created periodically, such as after a given amount of time has elapsed.

Event block collection 500 includes a header 502 and a block storage area 504 including one or more blocks 506 and block table(s) 508. Blocks 506 may be event blocks 326, compressed event blocks 326, or groupings of compressed or uncompressed event blocks 326. References to memory addresses where compressed or uncompressed block events 326 in block 506 are stored are arranged in one or more block table(s) 508 to facilitate quick look-up of sought after events and their associated interactions. For example, block table(s) 508 may include the addresses of all blocks 506 in event block collection 500 including thread information associated with a certain user ID. In another possible implementation, block table(s) 508 may include memory addresses of all blocks 506 included in event block collection 500 associated with a spreadsheet program or which include a timestamp in a given time range.

Header 502 in event block collection 500 further includes information describing the contents of storage area 504. In one implementation, header 502 includes versioning information 510, section descriptor(s) 512 and block table descriptor(s) 514. Versioning information 510 can include information relating to changes in event block collection 500. For example, versioning information 510 can include information relating to changes made from a preceding version of event block collection 500 to arrive at a current event block collection 500.

Section descriptor(s) 512 include start and end offsets indicating the beginning and the end of locations in memory, such as memory 304 and memory in collection server 106, where elements such as user table(s) 414, thread table(s) 416, and so on are stored. Such offsets can be realized through flags, pointers, etc. Similarly, block table descriptor(s) 514 can include start offset(s) 516 and end offset(s) 518 indicating the beginning and ends, respectively, of locations in memory, such as memory 304 or memory in collection server 106, where block table(s) 508 are stored. Moreover, in one implementation, start offset(s) 516 and end offset(s) 518 within block table descriptor(s) 514 indicate the beginning and ending of memory locations in collection server 106, where block tables 506 are stored.

Block table(s) 508 in storage area 504 include block entries 520. Block entries 520 include start offsets 522 and end offsets 524 indicating the start and end respectively of blocks 506 stored in storage area 504. Storage area 504 can be located in memory 304 or in memory of collection server 106.

It will be understood that times of events may be represented in a variety of ways. For example, in one implementation, a table of event IDs may exist in which each ID is an index into distinct file/registry/module/process events. These IDs can be ordered according to how they were received. This order may be maintained in terms of the order in which the IDs were generated or measured.

It will also be understood that a table of timestamps may be maintained. Multiple events may have the same timestamp. In such a way, a table can be organizing information such as: (1) a timestamp; (2) an offset of a first event with this timestamp; and (3) an offset of a last event with this timestamp.

It will further be understood that the structures and techniques discussed in conjunction with FIGS. 4 and 5 can be used with a wide variety of data types (including data and commands associated with threads, various programs, platforms, and so on) and for a variety of different applications. For example, the structures and techniques discussed in conjunction with FIGS. 4 and 5 can be used in conjunction with compression and query improvements for arbitrary logs. Moreover, in one exemplary implementation, the structures and techniques discussed in conjunction with FIGS. 4 and 5 can be used to improve business intelligence across varied areas, including Ad Sense analysis of web traffic.

Figure 6:
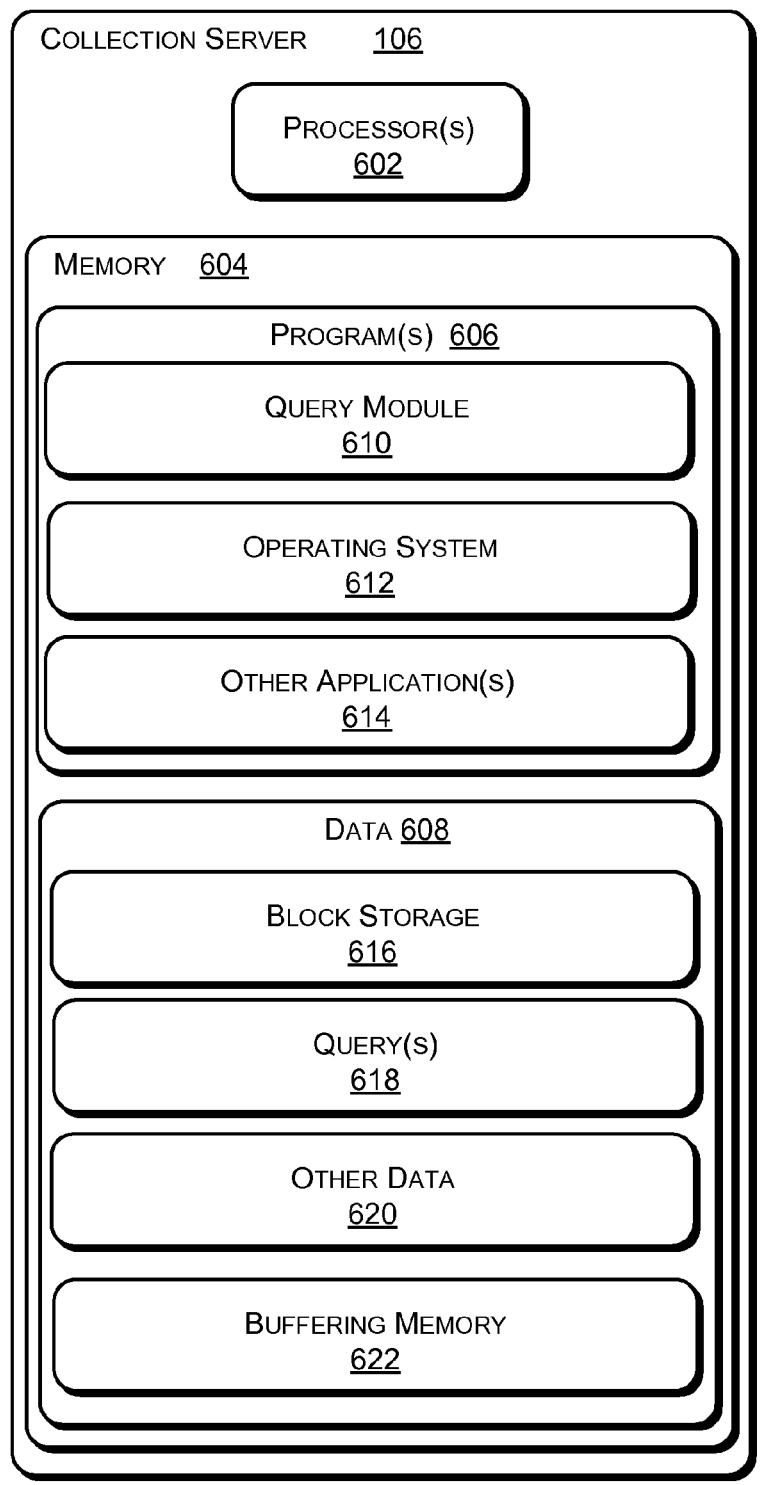
FIG. 6 illustrates an exemplary collection server.

FIG. 6 illustrates an exemplary collection server 106 configured to store, process and/or analyze data from thread data recorder 108. Collection server 106 includes one or more processor(s) 602 and a memory 604. Processor(s) 602 include, for example, microprocessors, microcomputers, microcontrollers, digital signal processors, central processing units, state machines, logic circuits, and/or any devices that manipulate signals based on operational instructions. Among other capabilities, processor(s) 602 are configured to fetch and execute computer-readable instructions stored in memory 604.

Memory 604 may be any computer-readable medium known in the art, for example, volatile memory (e.g., RAM) and/or non-volatile memory (e.g., ROM, flash, and so on). Memory 604 can also include program(s) 606 and data 608. Program(s) 606 can perform, among other operations, query-related processes on data associated with interactions between programs running on program layer 202 and file system 208. Program(s) 606 further include, for example, query module 610, operating system 612 and other application(s) 614.

In operation, query module 610 performs query-based operations on information collected by thread data recorder 108, such as information included in buffer memory 322, block storage 328 and/or block storage 616. Query(s) 618 can include a plurality of queries such as predefined queries or queries entered or programmed by one or more individuals or entities, such as a system administrator. For example, in one implementation, query(s) 618 can include instructions to detect all interactions associated with a given user ID. In another exemplary implementation, query(s) 618 can include instructions to detect all interactions associated with an application running on program layer 202.

Query module 610 can restrict query(s) 618 to one or more attributes. Such attributes can include filename, application type, time of execution, and so on. To restrict a query by attribute, query module 610 scans block storage 328 and/or block storage 616 for values that indicate the presence of the attribute. For example, if an individual wishes to search block storage 328 and/or block storage 616 for data related to a certain application such as a word processor, query module 610 searches block storage 328 and/or block storage 616 by restricting query(s) 618 to search for entries or events in block storage 328 and/or block storage 616 associated with the word processor.

In another possible implementation, further limitations can be provided in query(s) 618 to filter out data included within the retrieved results, and arrive at more selective search results. For example, query(s) 618 can be more complex, and include instructions to locate all interactions associated with a certain user ID, a certain application, and which have timestamps in a given range.

In one exemplary implementation, block storage 616 includes the same information stored in block storage 328. In another possible implementation, block storage 616 includes information different from information found in block storage 328. For example, block storage can include information retrieved from block storage 328, which has been altered, such as through processes including compression and organization. Moreover, query module 610 can query either or both of bulk storage 328 and bulk storage 616.

Data generated by program(s) 606, such as through the execution of searches by query module 610, can be stored in other data 620. Additionally, data generated by program(s) 606 may be stored in buffering memory 622, block storage 328, and/or block storage 616. In one possible implementation, buffer memory 622 can be located externally from collection server 106.

Operating system 612 and other application(s) 614 provide a computing environment for the functioning of collection server 106. Other application(s) 614 can include computer-based applications, like drivers and so on, that provide extended functionality to the running of collection server 106. Other application(s) 614 can also include applications that may or may not operate in conjunction with query module 610 to perform specific functions like word processing, numerical processing, and so on.

As discussed above in conjunction with FIG. 1, collection server 106 can store information in relation to interactions performed by one or more of computing-based devices 102, 104(a)-(n) of system 100. In one implementation, query module 610 can be used to analyze the operation of system 100 on the basis of data captured from intercepted threads a various instrumented functions in system 100. Query module 610 can do this by initiating a search of block storage 328 and/or block storage 616 using one or more queries from query(s) 618. Results generated by the execution of query(s) 618 can be retrieved and analyzed by collection server 106 or by an analyzing server to assess the performance of system 100. An exemplary analyzing server 700 is discussed in greater detail in conjunction with FIG. 7 below.

In another exemplary implementation, query module 610 can search through block storage 328 and/or block storage 616 by scanning through selected sections in block storage 328 and/or block storage 616. Sections in block storage 328 and/or block storage 616 can include normalized event information from event packets 324 stored in block storage 328 and/or block storage 616 and organized or arranged on the basis of certain attributes. Examples of sections in block storage 328 and/or block storage 616 include distinct PS interaction(s) 406.

Block storage 328 and/or block storage 616 can be arranged in sections within data 308 and/or data 608 respectively. For example, event information related to the execution of an Internet browser can be associated with a section in distinct PS interaction(s) 406 stored within data 308 and/or 608. Other applications running on program layer 202, and event information associated with the applications, can be associated with different sections in data 308 and/or 608 unique to the applications.

Sections to be searched by query module 610, such as distinct PS interaction(s) 406, can be located using one or more attributes in query(s) 618. Such attributes include filename, application type, time of execution, and so on. For example, if an individual wishes to search block storage 328 and/or block storage 616 for data related to interactions associated with a spreadsheet application, query module 610 can search the interaction information in block storage 328 and/or block storage 616 by restricting query(s) 618 to first search for sections in block storage 328 and/or block storage 616 including information associated with the identity of the spreadsheet application.

In another implementation, query module 610 can return information associated with interactions regarding accesses to a particular file. Accesses can include actions such as reading and writing to a file, as well as executing operations associated with a file. For example, query module 610 can scan string table(s) 420 in block storage 328, or block storage 616, for information such as a filename for the particular file being accessed, an application accessing the particular file, and so on. After obtaining information from string table(s) 420, such as the filename of the particular file being accessed, query module 610 can locate a filename ID corresponding to the filename and query module 610 can further scan sections of distinct PS interaction(s) 406 to obtain event information associated with the filename ID.

Instances of event information associated with the filename ID under consideration can indicate accesses of files with the corresponding filenames. Thus, results generated by query module 610 can indicate all accesses to a particular file. In yet another implementation, query module 610 can gather information relating to a frequency of a particular file being accessed by ascertaining the number of times the specified interaction has taken place.

In another possible implementation, query module 610 can be used to detect leaked files. Leaked files include files or registry settings that are left on a system, such as system 100, after a program that created the files or registry settings is uninstalled. To detect leaked files, query module 610 catalogues installation files and settings changes associated with each program loaded onto system 100. Later, if the program is uninstalled, a corresponding catalog of installation files and settings for the program can be recalled, and system 100 can be checked to make sure all installation files and registry settings have been removed or reset.

In one exemplary implementation, to detect leaked files on computing-based device 102 query module 610 catalogues installation files by running a scan through computing-based device 102 to detect all programs, such as applications, installed on computing-based device 102.

Query module 610 can also acquire a list of all programs registered in an installer database of operating system 314 running on operating system layer 206. Examples of installer databases include components which produce a populated list of all programs installed on a computing-based device under consideration.

Query module 610 queries block storage 328 and/or block storage 616 for registry information and enumerates a list of programs registered with operating system 314. Query module 610 can then scan block storage 328 and/or block storage 616 and enumerate the files and registry entries of all programs installed on computing-based device 102. In one exemplary implementation, to enumerate the files and registry entries, query module 610 can query for all files and registry entries corresponding to the program IDs of the programs installed on computing-based device 102.

If a file or setting on computing-based device 102 is not included in the files and registry entries corresponding to the program IDs of the programs installed on computing-based device 102, then query module 610 can deduce that the file or setting is a leaked file. Leaked files can be removed by query module 610, or various other programs, including operating system 314.

In another exemplary implementation, query module 610 can restrict a query using a time range. For example, query module 610 can query block storage 328 and/or block storage 616 for all interactions occurring between a given start and end time. In one implementation, query module 610 can achieve this by performing a scan of timestamp stream 404 for all interactions in block storage 328 and/or block storage 616 which have timestamps between the given start and end time.

In another exemplary implementation, query module 610 can detect stale processes due to changed files, settings, or stale modules, including common misconfigurations, old software versions, and so on. Stale processes occur when, for example, software upgrades fail to restart affected processes after replacing on-disk binaries, files, or settings. As a result, the computing-based device on which the stale process is found will disregard the upgrade and continue to execute based on the old binary, file, or setting.

To detect stale processes, query module 610 can query block storage 328 and/or block storage 616 for the last-load time of software installed. Query module 610 can also query block storage 328 and/or block storage 616 for the last-load time of files or registry settings associated with the software installed. In one exemplary implementation, query module 610 queries block storage 328 and/or block storage 616 for the last-load time of files or registry settings associated with the software associated dynamic link libraries (DLLs) installed with the software. Query module 610 can also query block storage 328 and/or block storage 616 for the time or date of the last modification of the software installed on the computing-based device. Such modifications include, for example, accesses performed on one or more files or program settings associated with the last known version of the installed software.

In case the last load time of the software is later than the time or date of the last known modification of the software, inconsistencies resulting from the software not utilizing the last loaded update, may occur. Such inconsistencies, if detected by the query module(s) 610, can be noted and corrected by an individual such as a system administrator.

In another possible implementation, query module 610 can detect occurrences of known unwarranted programs including software applications such as malware, spyware, trojans, and so on. To accomplish this, query module 610 can query and search block storage 328 and/or block storage 616 for programs loaded for execution in memory of one or more of computing-based devices 102, 104(*a*)-(*n*). The programs loaded for execution in memory may then be compared by, for example query module 610, against a list of known unwarranted programs.

For example, query module 610 can detect occurrences of programs loaded for execution in memory on computing-based device 102, 104(*a*)-(*n*) on the basis of identifiers, such as program IDs, associated with the programs. Query module 610 can then compare the identifiers of the programs loaded for execution in memory on computing-based device 102, 104(*a*)-(*n*) against a list of identifiers, such as program IDs, of known unwarranted programs. If an identifier of a program loaded for execution in memory matches an identifier of a known unwarranted program, query module 610 may implement the removal of the program loaded for execution in memory from computing-based device 102, 104(*a*)-(*n*). In one implementation, the list of identifiers of known unwarranted programs can be stored in other data 620. In another possible implementation, the list of identifiers of known unwarranted programs can be entered, at least in part, by a system administrator.

In another implementation, an unidentified program on computing-based device 102, 104(*a*)-(*n*) which does not have an identifier associated with it can be detected by query module 610 and reported to a system administrator to ascertain whether the unidentified program is an unwarranted program or not. The system administrator can examine the nature of the unidentified program by examining a purpose of the unidentified program, dependence of the unidentified program on other programs, and so on to determine if the unidentified program is unwarranted. Additionally, the system administrator can review past experience with programs having characteristics similar to those of the unidentified program to determine if the unidentified program is unwarranted.

If the system administrator determines that the unidentified program is unwarranted, the system administrator can implement the removal of the unidentified program from computing-based device 102, 104(*a*)-(*n*). For example, the system administrator can remove the unidentified program itself, or the system administrator can instruct elements of computing-based device 102, 104(*a*)-(*n*) and collection server 106, including thread data recorder 108, query module 610, and so on, to remove the unidentified program from computing-based device 102, 104(*a*)-(*n*).

Additionally, the system administrator may assign an identifier, such as a program ID, to the unidentified program, and include the identifier on a list of unwarranted programs. In this way, if the unidentified program appears on computing-based device 102, 104(*a*)-(*n*) it can be quickly identified as an unwarranted program by elements of computing-based device 102, 104(*a*)-(*n*) and collection server 106. Moreover, the removal of the unidentified program can be implemented by elements of computing-based device 102, 104(*a*)-(*n*) and collection server 106.

In yet another possible implementation, query module 610 can also detect extensibility points (EPs). EPs are files, including registry keys, in the persistent state that can cause dynamic loading and execution of instructions associated with a program, running on program layer 202, or an operating system running on operating system layer 206. EPs can be direct EPs or indirect EPs. For example, direct EPs can include EPs associated with a first program, which mane a second program to be executed in response to execution of the first program. For example, a direct EP associated with a first program—such as a word processor, a spreadsheet application and so on—implements execution of the first program by, for example, interacting with elements such as file system 208, operating system layer 206, etc. As will be discussed in more detail below, indirect EPs include EPs in the second program, which mane additional programs to be executed in response to execution of the second program.

Direct EPs can be detected by query module 610. For example, query module 610 can detect direct EPs by isolating interactions which both (1) pertain to various programs loaded in system memory for execution after the execution of the first program, and (2) which reference the first program or are associated with the running of the first program.

In one exemplary implementation, query module 610 can identify potential direct EPs for the first program by querying block storage 328 and/or block storage 616 for interactions pertaining to various programs loaded in system memory for execution after execution of the first program. For example, query module 610 can query for interactions pertaining to various programs loaded in system memory for execution within a given time range, such as 2 seconds, after the execution of the first program. Query module 610 can identify direct EPs associated with the first program from the potential EPs by querying the potential EPs for interactions that reference the first program or are associated with the running of the first program. In one possible implementation, direct EPs can be stored in buffer memory 620.

In addition to direct extensibility points, indirect extensibility points may also exist. For example, on starting-up, the first program may also trigger instructions associated with secondary programs, such as add on programs, to provide additional functionality to the running of the first program. One or more indirect extensibility points associated with the secondary programs and/or the first program can implement execution of the secondary programs by, for example, interacting with elements which may include the first program, file system 208, operating system layer 206, etc. Query module 610 can be used to detect indirect EPs. In one exemplary implementation, query module 610 can query block storage 328 and/or block storage 616 for interactions which are associated with the first program and /or the secondary programs. Moreover, in one possible implementation, indirect EPs can be stored in buffer memory 620.

It will also be understood that the term secondary programs may include a broad range of programs operating within a system. Returning to the example above, secondary programs may include add on programs to existing secondary programs. In this way, secondary programs may be associated with secondary programs, which are themselves associated with secondary programs, and so on.

Further, the term indirect extensibility points will be understood to include extensibility points associated with add on programs to the various secondary programs running in a system.

In one implementation, event information associated with the various interactions between the first program, the secondary programs, and file system 208 can be used to estimate other characteristics associated with the first program and/or the secondary programs. For example, event information associated with the various interactions can be used to estimate the amount of memory used by the first program and/or the secondary programs, as well as the amount of processing overhead used by the first program and/or the secondary programs, and so on.

The various interactions generated as a result of the running of the first program and the secondary programs can be intercepted and copied by, for example, thread data recorder 108. Event information associated with the various interactions can be stored as described above in memory 304, such as in event packets 324 and event blocks 326, and in memory 604, such as in block storage 616. The stored event information can be reviewed by entities, such as a system administrator, to detect interactions associated with the first program and the secondary programs. In this way, the secondary programs associated with the running of the first program can be detected.

Query module 610 can also be used to detect a presence of malicious software applications by monitoring direct EPs. Malicious software applications can include applications such as spyware, trojans, worms, viruses, and so on which under normal circumstances would not be associated with a program. For example, query module 610 can compare EPs for a program running on computing-based device 102, 104(a)-(n) against control EPs for the same program found when the program was run on computing-based device 102, 104(a)-(n) in the absence of malicious software. Differences between the EPs and the control EPs can be examined by entities such as query module 610 and a system administrator, to determine if the differences indicate the presence of malicious software running in conjunction with the program. In one implementation, malicious software found using EPs can be removed from computing-based device 102, 104(a)-(n) by query module 610, thread data recorder 108, the system administrator, and so on.

Figure 7:
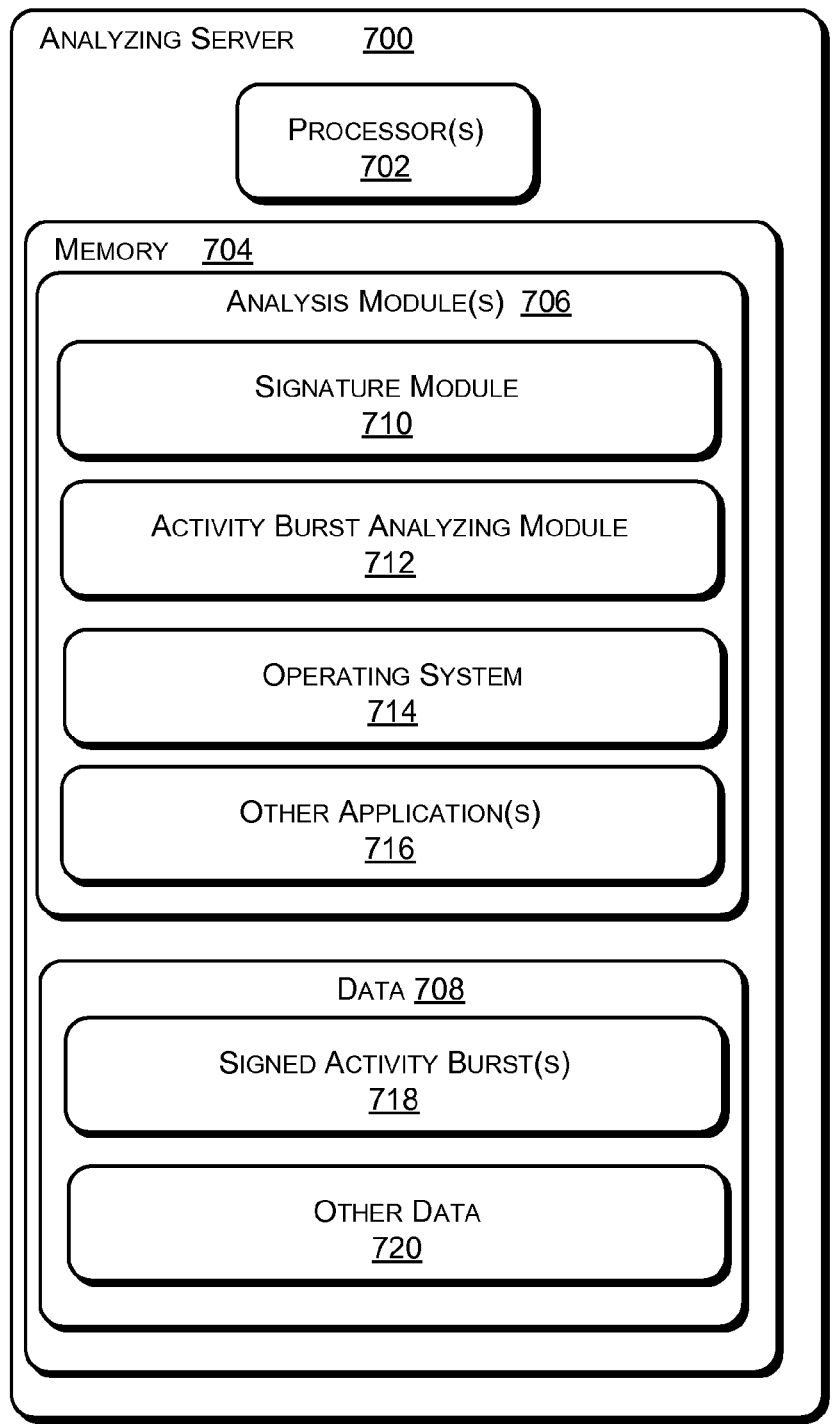
FIG. 7 illustrates an exemplary analyzing server.
Figure 8:
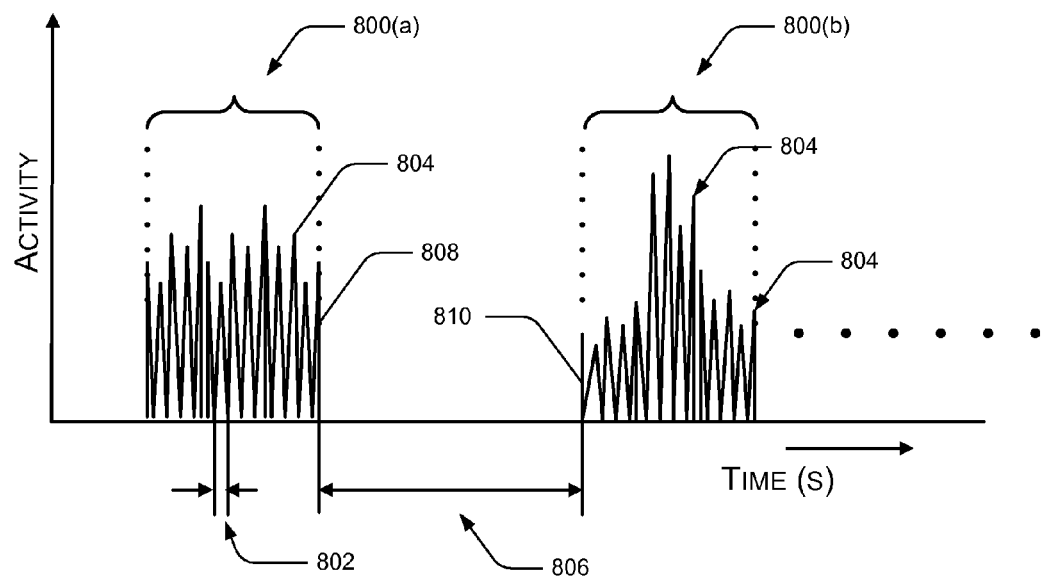
FIG. 8 illustrates an exemplary representation of one or more activity bursts.

FIGS. 7-8 illustrate how data collected by collection server 106 may be analyzed using activity bursts. For example, FIG. 7 illustrates an exemplary analyzing server 700 for performing analysis on data collected by collection server 106. As will be described in more detail below, in one exemplary implementation, analyzing server 700 analyzes data collected by collection server 106 through analysis of activity bursts.

Analyzing server 700 includes one or more processor(s) 702 and a memory 704. Processor(s) 702 include, for example, microprocessors, microcomputers, microcontrollers, digital signal processors, central processing units, state machines, logic circuitries, and/or any devices that manipulate signals based on operational instructions. Among other capabilities, processor(s) 702 are configured to fetch and execute computer-readable instructions stored in memory 704.

Memory 704 may be any computer-readable medium known in the art, including volatile memory (e.g., RAM) and/or non-volatile memory (e.g., ROM, flash, etc.). Memory 704 includes analysis module(s) 706 and data 708.

In operation, analysis module(s) 706, among other things, monitor activity of computing-based devices 102, 104(a)-(n) in system 100, and analyze data collected by collection server 106. Data generated by analysis module(s) 706, or data required during the course of execution of analysis module(s) 706, is stored in data 708. The activity of system 100, such as interactions between programs running on program layer 202 and files and/or settings in file system 208 among the various computing-based devices 102, 104(a)-(n) can be represented through the use of activity bursts.

As shown in FIG. 8 an activity burst 800 includes a group of interactions, with each interaction being separated by a gap interval 802. Though the discussion below describes intervals on the horizontal axis in FIG. 8 as being based on time, it will be understood that these intervals—and the horizontal axis in FIG. 8—can be based on other dimensions as well. For example, in addition to including clusters of related activity along the time dimension, activity bursts 800 can also include clusters of activity along other dimensions (such as groupings of activities by user, a given program, and so on). In this manner, bursts of activity along many assorted dimensions can be found and investigated.

Returning to the implementation illustrated in FIG. 8, activity bursts can include activity responses 804 corresponding to individual interactions that occur close together in time, within one or more threads. An activity response 804 corresponds to any usage of resources, such as memory and processors, of computing-based device 102, 104(a)-(n) in the execution of threads that result in interactions. Exemplary instances of when interactions may generate an activity response 804 include processing done by a processing unit, such as processor(s) 302, and memory, such as memory 304, utilized during execution of a thread resulting in an interaction. Further exemplary instances of when interactions may generate an activity response 804 include activity of peripheral units including memory and one or more processors, such as printers, scanners, and similar devices used for, or in conjunction with, computing-based device 102, 104(a)-(n). In FIG. 8, the height of an activity response 804 corresponds to the use of resources of computing-based device 102, 104(a)-(n) during the execution of a thread with which the activity response 804 is associated.

Activity responses 804 are separated by gap intervals 802, with gap interval 802 being smaller than an inactivity interval 806 between activity bursts 800. In one implementation, inactivity interval 806 is a period of time between a last activity response 808 in an activity burst 800(a) and a first activity response 810 in an adjacent activity burst 800(b).

In one implementation, gap interval 802 can be the time required for a single interaction to take place. Moreover, in one exemplary embodiment, activity bursts 800 can be defined as a group of interactions $\{e t | i \leq t \leq j\}$ where $$\text{gap } (e_t, e_{t+1}) < k \text{ for all } i \leq t \leq j;$$

$$\text{gap } (e_{i-1}, e_i) > k;$$

$$\text{gap } (e_j, e_{j+1}) > k.$$

Given that gap (x,y) is a time interval between two interactions x and y corresponding to separate activity responses 804; and k is a threshold gap between adjacent activity responses 804. In one exemplary implementation, k is approximately sixty seconds.

Returning to FIG. 7, analyzing server 700 can analyze activity burst 800 through the use of a signature module 710, activity burst analyzing module 712, an operating system 714 and other application(s) 716 in analysis module(s) 706. Similarly analyzing server 700 can store information regarding activity bursts in data 708, which can include signed activity burst(s) 718 and other data 720.

The activity burst analyzing module 712 monitors activity bursts 800 of system 100 for similarity. Similar activity bursts 800 are indicative of the execution of similar threads generated by a specific program. On encountering similar activity bursts 800, signature module 710 can assign a signature to the similar activity bursts 800, and the signature can be stored in signed activity burst(s) 718. In one possible implementation, signature module 710 calculates the signature to be assigned to similar activity bursts 800 on the basis of attributes that characterize the interactions included in activity bursts 800. For example, signature module 710 can arrive at a signature to be assigned to an activity burst by hashing filenames of files associated with an interaction, type of interaction, and so on. Moreover, signature module 710 can arrive at a signature to be assigned to an activity burst by hashing file paths, and hashing identifiers of activity types.

An activity burst 800 encountered by analyzing server 700 can be compared against activity bursts 800 stored in signed activity burst(s) 718. If the activity burst 800 is similar to an activity burst 800 stored in activity burst(s) 718, the activity burst 800 can be assigned the signature of the similar activity burst in signed activity burst(s) 718 by signature module 710.

In one exemplary implementation, the same signature may be assigned by signature module 710 to all activity bursts 800 corresponding to one or more interactions with temporary files. Temporary files include files that are created during installation of a program on computing-based devices 102, 104(a)-(n), and changes in temporary files appear as interactions in block storage 328 and/or block storage 616.

In yet another exemplary implementation, interactions corresponding to known unwarranted or unauthorized actions—as defined by a system administrator, for example—can be prevented by associating an activity burst 800 for such actions with a forbidden action signature. For example, known unwarranted or unauthorized actions, such as unauthorized read and/or write operations to one or more files, and unauthorized read and/or write operations to registry settings, can be assigned a forbidden action signature by signature module 710. When an activity burst 800 having a forbidden action signature is detected (by analyzing module 712, thread data recorder 108, etc) elements including activity burst analyzing module 712 and thread data recorder 108, can prohibit the execution of one or more threads associated with activity burst 800 by blocking transmission of the one or more threads to file system 208.

In another possible implementation, analyzing server 700 can identify the presence of unwarranted or rogue programs by detecting an occurrence of a signature associated with an activity burst 800 corresponding to the unwarranted or rogue programs. When the signature for such an activity burst 800 is detected by the activity burst analyzing module 712, elements including activity burst analyzing module 712 and thread data recorder 108, can prohibit the execution of one or more threads associated with activity burst 800 by preventing calling by one or more threads to file system 208. Moreover, elements including thread data recorder 108, activity burst analyzing module 712 and a system administrator, can analyze threads associated with activity burst 800 corresponding to the unwarranted or rogue programs to isolate an identity or location of the unwarranted or rogue programs. Elements including thread data recorder 108, activity burst analyzing module 712 and a system administrator, can also remove the unwarranted or rogue programs from computing-based device 102, 104(a)-(n).

In yet another possible implementation, security auditing of access to files, settings, or modules can be tracked using activity burst analyzing module 712. For example, access to files, settings, or binaries can be restricted by vetoing any access made from threads or programs that are not within a set policy allowing access. In such an implementation, access can be granted based on a running instance of a program. For example, the set policy may restrict access to certain documents to a word processor, rather than individual users. In such an implementation, thread based interception can be used to identify applications making calls to certain documents and verify that the application may be granted access according to the policy.

In another possible implementation, thread interception and analysis can be used to block copying of files to network drives or removable locations by vetoing writes to such locations based on a program or thread that was running. Moreover, thread interception and analysis can be used to conduct security auditing. For example, by monitoring interactions with files on a system, the copying of copyrighted or otherwise protected or sensitive material to CDs or other removable devices can be detected.

Additionally, thread interception and analysis can also be used to forensically reconstruct a system. For example, auditing logs created using thread based interception can be used after a hacker has broken in to a system to reconstruct the system and ameliorate changes the hacker made to the system.

Exemplary Method(s)

Exemplary methods for thread interception and analysis are described with reference to FIGS. 1 to 8. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 9:
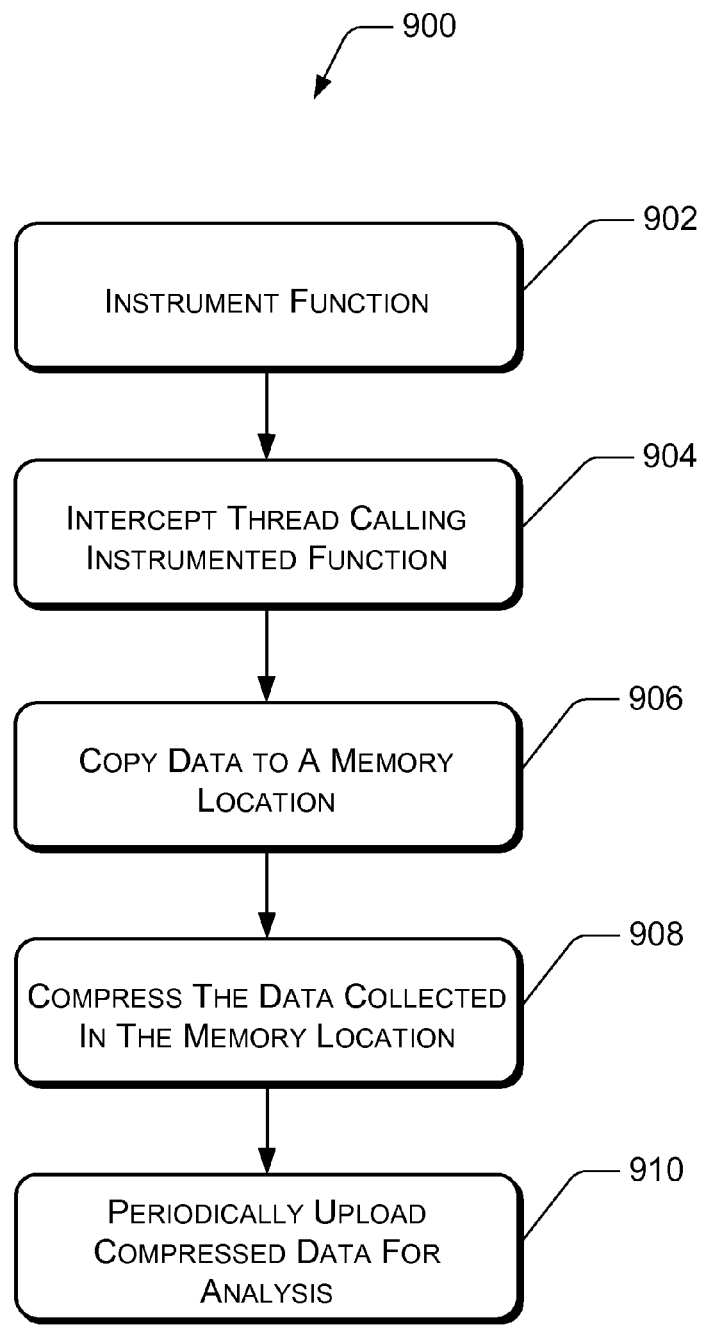
FIG. 9 illustrates exemplary method(s) for intercepting threads and capturing data associated with the threads.

FIG. 9 illustrates an exemplary method 900 for intercepting threads and capturing data associated with the threads. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 902, one or more functions running on a system are instrumented to include modified function code. In one implementation, the one or more functions can be instrumented by modifying computer readable instructions associated with the one or more functions. For example, the computer readable instructions can be modified to instruct the one or more functions to intercept threads calling the one or more functions and capture data associated with the threads. For example, in one implementation, a thread data recorder, such as thread data recorder 108, can instrument one or more functions in system 100. The functions may be in any operating layer 202, 204, 206. In one possible implementation, choke point functions are instrumented to include code for intercepting threads calling the choke point functions, and capturing data associated with the threads.

At block 904, a thread associated with a program running on a system is intercepted as the thread calls an instrumented function including modified function code. In one implementation, the instrumented function logs a stream of events associated with the thread as the thread executes. Threads are associated with programs and therefore program information can be obtained when a thread is examined by an instrumented function the thread calls into. A timestamp for each interaction can be assigned by the instrumented function.

For example, in one implementation, a thread data recorder, such as thread data recorder 108, can intercept threads calling modified functions in system 100. Programs with which the threads are associated may be running in one of several operating layers, such as program layer 202, middleware layer 204, operating system layer 206, etc. A file system, such as file system 208, with which the program may be trying to interact can include files (such as data files, executable files), and settings information (such as configuration settings or registry settings), and so on.

At block 906, various information associated with the thread, including interaction being instigated by the thread, is copied and transmitted into a memory location, grouped together as an event. For example, a duplicating module, such as duplicating module 318, can copy all or selected data associated with the thread and store the data in a memory location, such as buffer memory 322. Information associated with the thread can include any information regarding interactions instigated by the thread, as well as any information regarding the system at the point the thread executes the modified function code at the instrumented function.

Buffer memory 322 can, in one implementation, be either internally or externally located with respect to computing-based devices 102, 104(*a*)-(*n*).

At block 908, data stored in the memory location is compressed. In one implementation, data, such as event packets 324 stored in buffer memory 322, is compressed by compressing module 310 into an event block 326. Compression may be effected by a service, such as, for example user daemon 312. In one instance compression may be instigated when a processor (to be used to perform the compression) is being used at or below a predetermined activity level. In one implementation, the compressed data can be stored in another memory location. For example, the compressed data can be stored in block storage 328 rather than buffer memory 322.

At block 910, the compressed data is periodically uploaded for analysis. In one implementation, the compressed data may be uploaded to a collection server 106 or to a memory location serving as a collection server 106. The periodicity of uploading the compressed data for analysis can be varied. In one implementation, the compressed data is uploaded after specified intervals of time. In another possible implementation, the compressed data can be uploaded when the compressed data exceeds a predefined threshold limit of memory.

Figure 10:
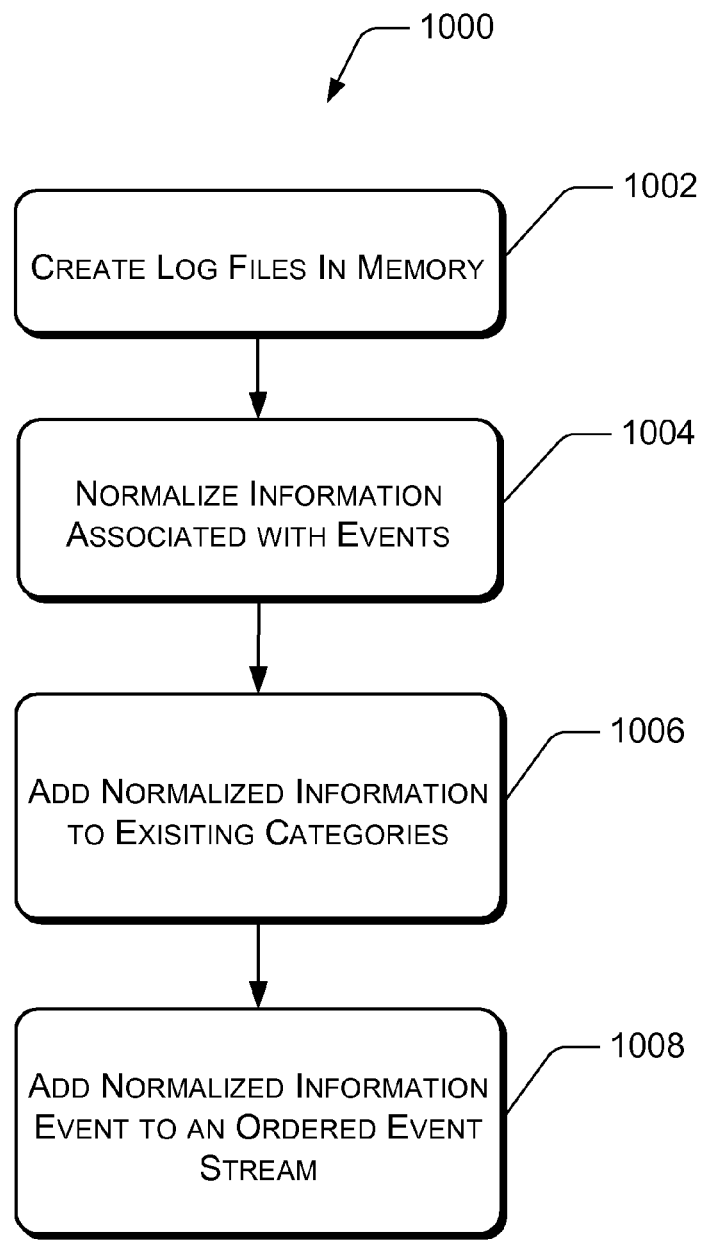
FIG. 10 illustrates exemplary method(s) for adding normalized events to an ordered event stream.

FIG. 10 illustrates an exemplary method 1000 for adding normalized events to an ordered event stream in one or more computing-based devices. Normalization of events in an ordered event stream reduces redundancy of data. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1002, logs of compressed data are created by one or more computing-based devices in a system. For example, a service, such as user daemon 312, copies data intercepted by a thread data recorder, such as thread data recorder 108 for compression. The data is compressed and stored as a compressed log format, such as an event block 326, in a memory location, such as block storage 328. In one implementation, compression may be instigated when a processor (to be used to perform the compression) is being used at or below a predetermined activity level At block 1004, information associated with events corresponding to intercepted threads is normalized. In one implementation, normalization includes grouping together related information, such as information associated with events corresponding to the execution of a word processor program.

For example, attributes of different interactions occurring within system 100 can be normalized into one or more sections of distinct PS interaction(s) 406 such as distinct file interaction(s) 408, distinct registry interaction(s) 410, process table(s) 412, module table(s) 414, and other interaction (s) 416. In one possible implementation, distinct file interaction(s) 408 further include sections including information such as distinct names, user context, process information, file data hashes, and values, which can be stored in user table(s) 418, thread table(s) 420, string table(s) 422, other table(s) 424, etc.

At block 1006, newly normalized information associated with events is added to preexisting categories of similar normalized information associated with events. For example, blocks of normalized information associated with events, such as event blocks 326, can be added to similar normalized information in previously created event blocks 326 already stored in block storage 328. Returning to our example above, newly normalized information associated with the execution of the word processor can be added to preexisting normalized information associated with prior executions of the word processor.

In the event that no preexisting categories of normalized information associated with events exist which shares similarities with the newly normalized information, a new category can be created and the newly normalized information associated with events can be stored in the new category.

At block 1008, all of the existing categories of normalized information associated with events are merged into an ordered event stream. For example, normalized information associated with events stored in block storage 328 is merged into event stream 404.

Figure 11:
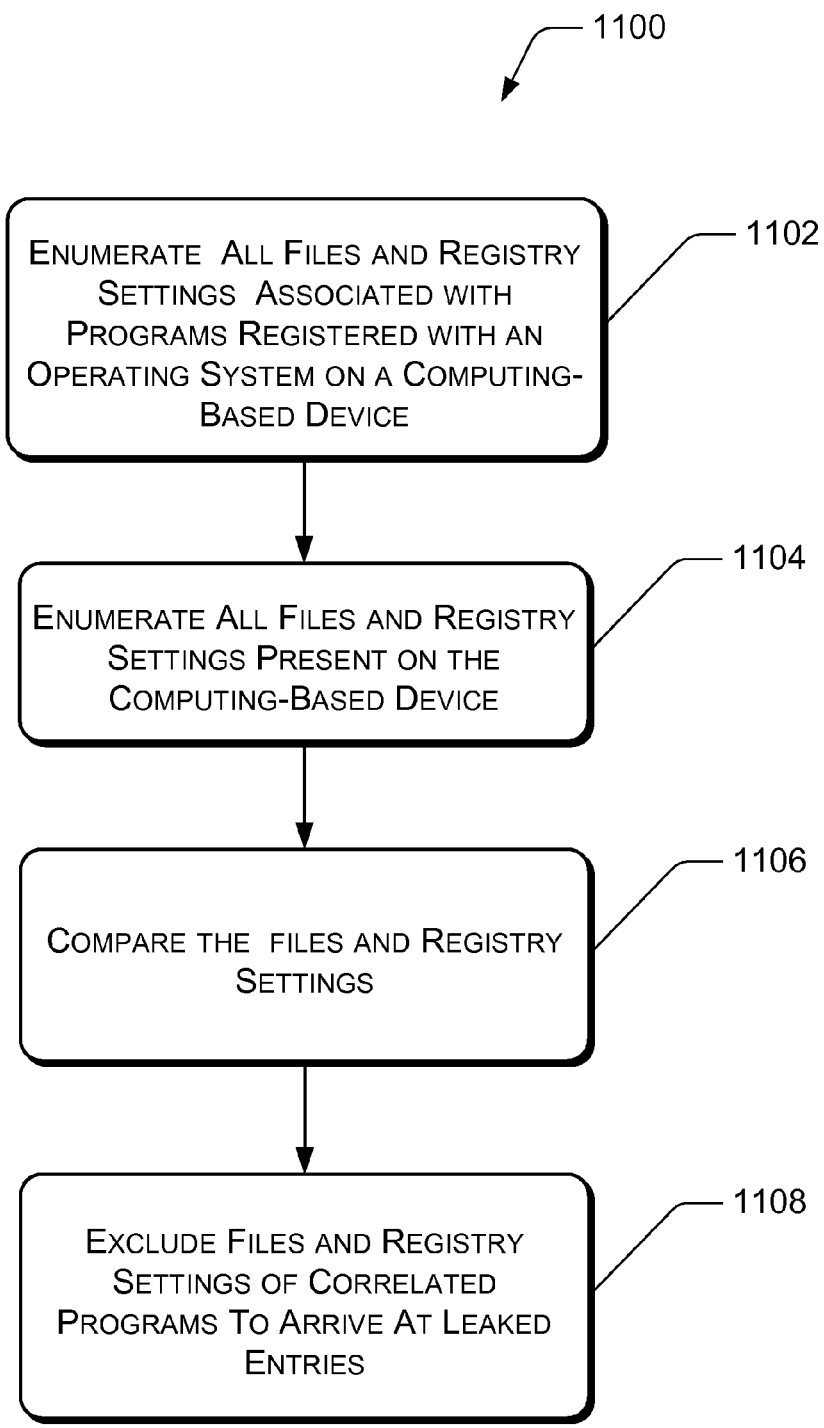
FIG. 11 illustrates exemplary method(s) for detecting leaked entries.

FIG. 11 illustrates an exemplary method 1100 for detecting leaked entries that have been left behind as a result of uninstalling a program from a computing-based device. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1102, installation files and settings changes associated with each program loaded onto a computing-based device and/or system are cataloged and enumerated. In one implementation, enumeration includes creating a list of programs registered with an operating system of the computing-based device.

For example, a system can be scanned to detect all programs that are installed on computing-based devices in the system as well as all operating system installation files associated with the programs on the computing-based devices. All programs installed on the computing-based devices and/or all operating system installation files associated with the programs may be enumerated by placing them in a list.

In one possible implementation, query module 610 runs a scan through system 100 detecting all programs that are installed on one or more computing-based devices 102, 104(*a*)-(*n*) to catalogue and enumerate all operating system installation files on computing-based devices 102, 104(*a*)-(*n*). For example, query module 610 can query block storage 328 and/or block storage 616 for all programs registered with operating system 314 of one or more of computing-based devices 102, 104(*a*)-(*n*) in system 100. The programs found may be cataloged and enumerated by a variety of devices, such as query module 610, thread data recorder 108, and so on. Moreover, all operating system installation files on computing-based devices 102, 104(*a*)-(*n*) associated with the programs found may be cataloged and enumerated by a variety of devices, such as query module 610, thread data recorder 108, and so on.

At block 1104, all files and registry settings present on a computing-based device and/or system, including files and registry settings associated with uninstalled programs, are enumerated. This can involve the scanning of memory on the computing-based device and/or system for files and registry settings of all programs that have been installed on the computing-based device and/or system—including files and registry settings for programs that have been uninstalled. For example, query module 610 can query block storage 328 and/or block storage 616 to obtain all files and registry settings corresponding to identifiers, such as program IDs, of all programs that have been installed on computing based devices 102, 104(*a*)-(*n*).

At block 1106, the files and registry settings associated with programs registered with the operating system are compared against the files and registry settings of programs that have been installed on the computing-based device and/or system. For example, query module 610 can compare identifiers, such as program IDs, of the enumerated files and registry settings associated with the programs registered with the operating system of computing-based devices 102, 104(*a*)-(*n*) against identifiers of files or settings of all programs which have been installed on computing-based devices 102, 104(*a*)-(*n*).

At block 1108, files and registry settings associated with programs on both lists can be excluded from consideration. The remaining files and registry settings, which represent files and registry settings corresponding to programs that have been uninstalled from the computing-based device and/or system can be termed leaked files, and can be removed from the computing-based device and/or system. For example, query module 610 can correlate identifiers, such as program IDs, of files and registry settings associated with programs registered with operating system 314 of computing-based devices 102, 104(*a*)-(*n*) with identifiers of files and registry settings associated with programs that have been installed on computing-based devices 102, 104(*a*)-(*n*). The files and registry settings associated with the non correlated programs can be termed leaked files by query module 610, and can be removed from computing-based devices 102, 104(*a*)-(*n*) by elements such as thread data recorder 108 and query module 610.

Figure 12:
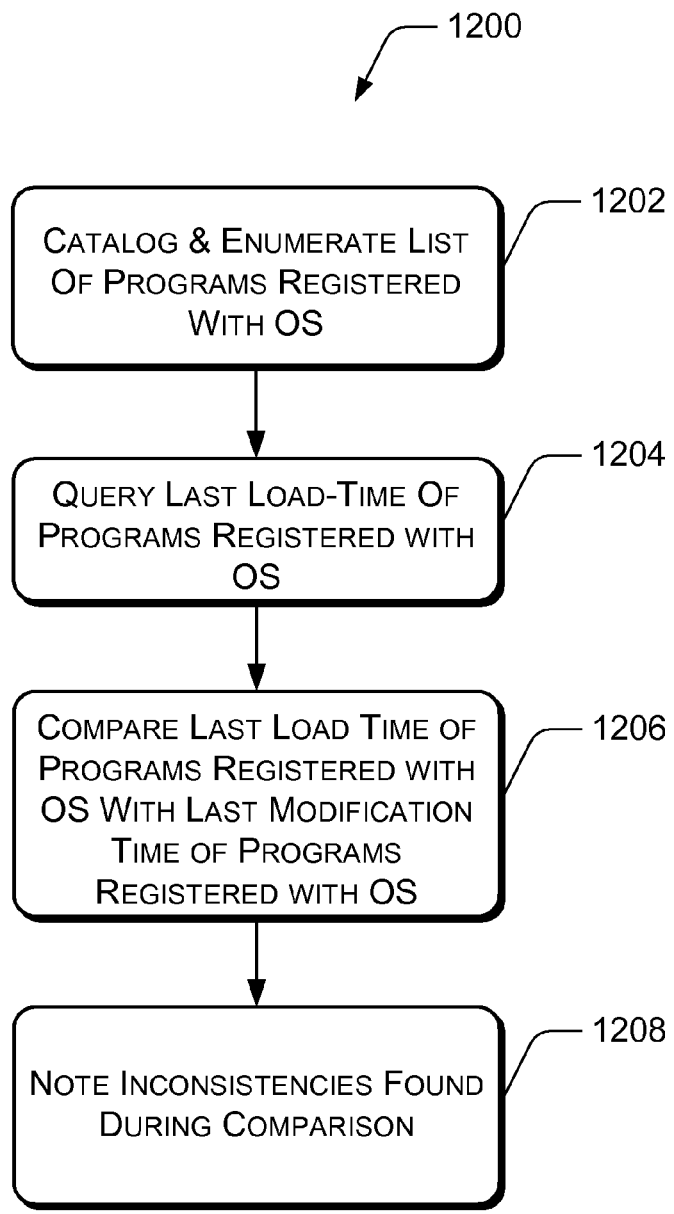
FIG. 12 illustrates exemplary method(s) for detecting common misconfigurations.

FIG. 12 illustrates an exemplary method 1200 for detecting stale files including common misconfigurations, old software versions etc., installed on a computing-based device. Stale binaries occur when, for example, software upgrades fail to restart affected processes after replacing on-disk binaries. As a result, the computing-based device on which the stale binary is found will disregard the upgrade and continue to execute the old program from the old binary. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1202, programs loaded onto a computing-based device and/or system are cataloged and enumerated. In one implementation, enumeration includes creating a list of programs registered with an operating system of the computing-based device. For example, a system can be scanned to detect all programs that are installed on computing-based devices in the system. All programs installed on the computing-based devices may be enumerated by placing them in a list.

In one possible implementation, query module 610 runs a scan through system 100 detecting all programs that are registered on one or more computing-based devices 102, 104(*a*)-(*n*) to catalog and enumerate all programs registered with operating system 314 on computing-based devices 102, 104(*a*)-(*n*). For example, query module 610 can query block storage 328 and/or block storage 616 for all programs registered with operating system 314 of one or more of computing-based devices 102, 104(*a*)-(*n*) in system 100. The programs found may be cataloged and enumerated by a variety of devices and/or entities, such as query module 610, thread data recorder 108, and so on.

At block 1204, last load times of all programs registered on a computing-based device and/or system, as well as DLLs associated with the programs registered on the computing-based device and/or system, are acquired. For example, query module 610 queries block storage 328 and/or block storage 616 for the last-load times of programs registered on computing-based devices 102, 104(*a*)-(*n*) and/or last-load times of dynamic link libraries (DLLs) installed with the programs registered on computing-based devices 102, 104(*a*)-(*n*) in system 100.

At block 1206, last modification times of files or settings associated with programs registered on a computing-based device and/or system are acquired and compared with the last-load times of the programs. For example, query module 610 can query block storage 328 and/or block storage 616 for a time or date of the last modification of a program registered with operating system 314 on computing-based device 102, 104(*a*)-(*n*). Query module 610 can compare the time or date of the last modification with a last load time of the program.

At block 1208, any inconsistencies found during the comparison are noted. For example, in case a last load time of a program registered on a computing-based device and/or system is earlier than a time or date of a last known modification of the program, it is possible that the program has not responded to the last modification. In such a case, an error report may be issued to entities such as a user or a system administrator, reporting that the program is not responding to the last attempted modification. Alternately, an attempt may be made to cause the program to load the modified version.

In one exemplary implementation, query module 610 can query for both a last load time and a last modification time of a program registered with operating system 314 on computing based device 102, 104(*a*)-(*n*) in system 100. Query module 610 can compare the last load time and the last modification time and if the last load time of the program is earlier than the last modification time of the program, query module 610 can issue an error report to entities such as a user or a system administrator, reporting that the program is not responding to the last attempted modification. Query module 610 can also attempt to cause the program to load the modified version.

Figure 13:
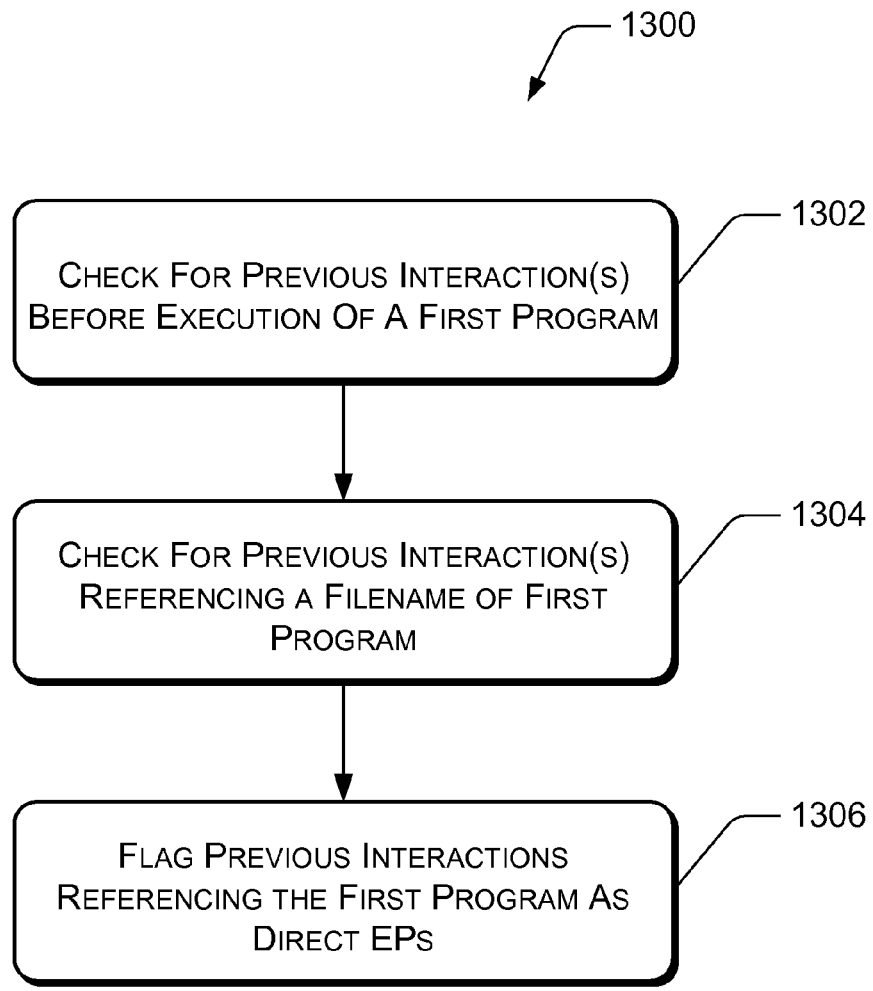
FIG. 13 illustrates exemplary method(s) for detecting one or more extensibility points.

FIG. 13 illustrates an exemplary method 1300 for detecting one or more extensibility points (EPs) of a program installed on a computing-based device. EPs include interactions that control the dynamic loading and execution of a computer application. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1302, previous interactions (i.e. interactions pertaining to various programs loaded for execution in a system memory before the execution of a first program) are checked. For example, query module 610 can identify potential direct extensibility points (EPs) associated with a first program by querying block storage 328 and/or block storage 616 for interactions pertaining to various programs loaded into memory 304 for execution before execution of the first program. In one exemplary implementation, query module 610 can query for interactions pertaining to various programs loaded in memory 304 for execution within a given time range, such as two seconds, before execution of the first program.

At block 1304, a check is performed to find previous interactions which reference a filename of the first program loaded for execution in system memory of a computing-based device. For example, query module 610 can query for interactions associated with various programs referencing the first program or which are associated with the execution of the first program on computing-based device 102, 104(*a*)-(*n*). Query module 610 can query for interactions including various attributes, such as a filename of the first program, a program ID of the first program, and so on.

At block 1306, the previous interactions referencing the filename of the first program are flagged as direct EPs. For example, query module 610 can identify direct EPs associated with the first program by querying for all previous interactions which reference the first program or which are associated with the execution of the first program.

In one implementation, other interactions associated with various secondary programs referencing the direct EPs, are termed as indirect EPs. For example, query module 610 can query block storage 328 and/or block storage 616 for all interactions which both (1) are associated with the various secondary programs loaded for execution in memory 304 after the execution of the first program and which (2) also reference any of the direct EPs, or which reference indirect EPs (associated with secondary programs).

In yet another possible implementation, indirect EPs can also be determined by locating interactions that reference direct or indirect EPs.

Figure 14:
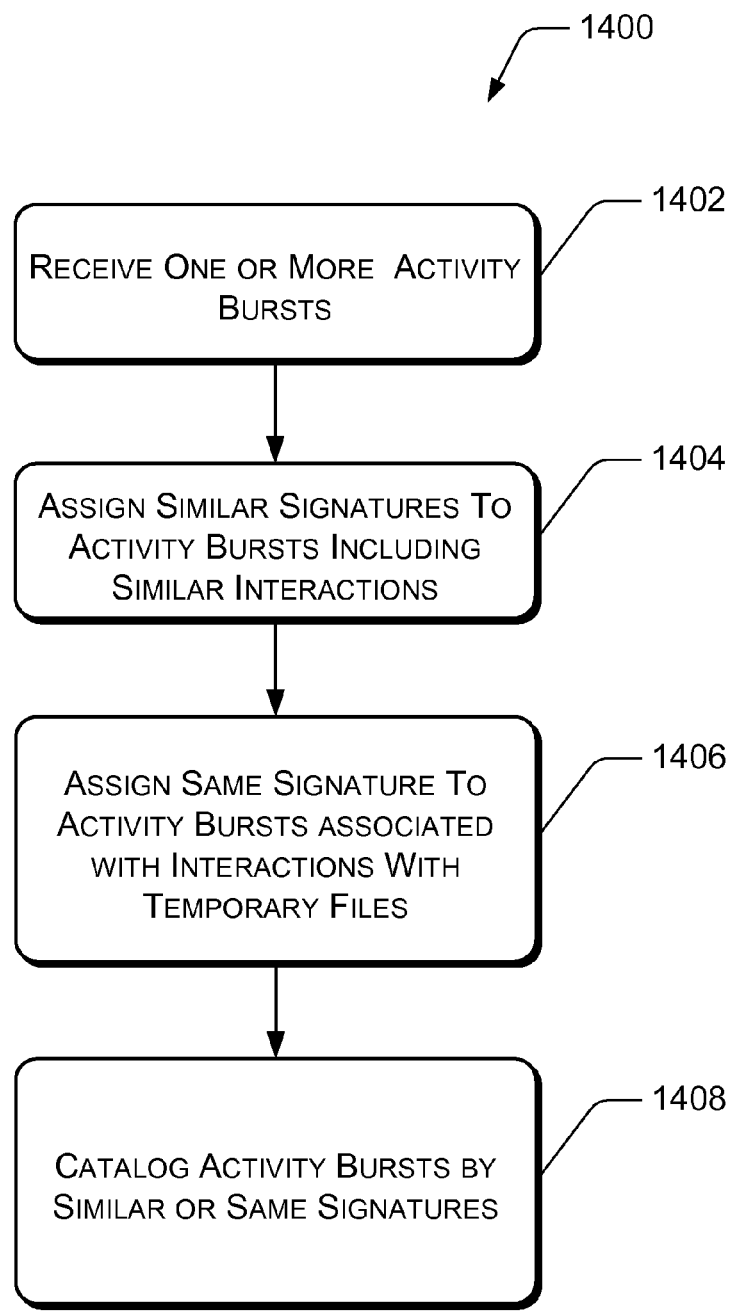
FIG. 14 illustrates exemplary method(s) for analyzing one or more activity bursts.

FIG. 14 illustrates an exemplary method 1400 for detecting one or more activity bursts due to the interactions of program(s) running on a computing-based device. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1402, one or more activity bursts are received. For example, activity bursts can be received by analyzing server 700 and can correspond to prior interactions received from an external storage device, such as collection server 106. Alternately, activity bursts can be received dynamically from computing devices 102, 104(*a*)-(*n*).

In one implementation, activity bursts can include activity responses corresponding to individual interactions that occur close together in time, within one or more threads. Alternately, activity bursts can include activity responses corresponding to individual interactions grouped on the bases of other dimensions, such as groupings of activities by user, a given program, and so on. Moreover, individual activity responses in activity bursts can correspond to a usage of resources, such as memory and processors, of a computing-based device in the execution of threads that result in interactions.

At block 1404, activity bursts which are similar, including activity bursts which differ slightly from one another, are assigned similar signatures. In one implementation, activity bursts can differ slightly from one another by including a small number of different activity responses and/or a small number of different times between activity responses.

For example, similar activity bursts 800 are indicative of execution of similar threads generated by a specific program. An activity burst analyzing module 712 can monitor activity bursts 800 of system 100 for similarity. On encountering similar activity bursts 800, signature module 710 can assign similar signatures, which can be the same or can differ only slightly from one another, to the similar activity bursts 800. Moreover, the similar signatures and/or the activity bursts 800 which have been assigned the similar signatures can be stored in signed activity burst(s) 718.

At block 1406, a same signature can be assigned to activity bursts associated with interactions with temporary files. Temporary files can include files that are created during installation of a program on computing-based devices, such as computing-based devices 102, 104(*a*)-(*n*). In one possible implementation, changes in temporary files appear as interactions in block storage 328 and/or block storage 616. Hence all interactions associated with temporary files can be assigned the same signature by the signature module 710.

At block 1408, activity bursts assigned similar or same signatures are cataloged according to the similar or same signature. For example, signature module 710 can store an activity burst 800 which has newly been assigned a same or similar signature in signed activity burst(s) 718. In one implementation signed activity burst(s) 718 may further be arranged according to specific criteria, such as by programs associated with a generation of activity bursts 800, or by interactions associated with activity bursts 800, and so on.

Figure 15:
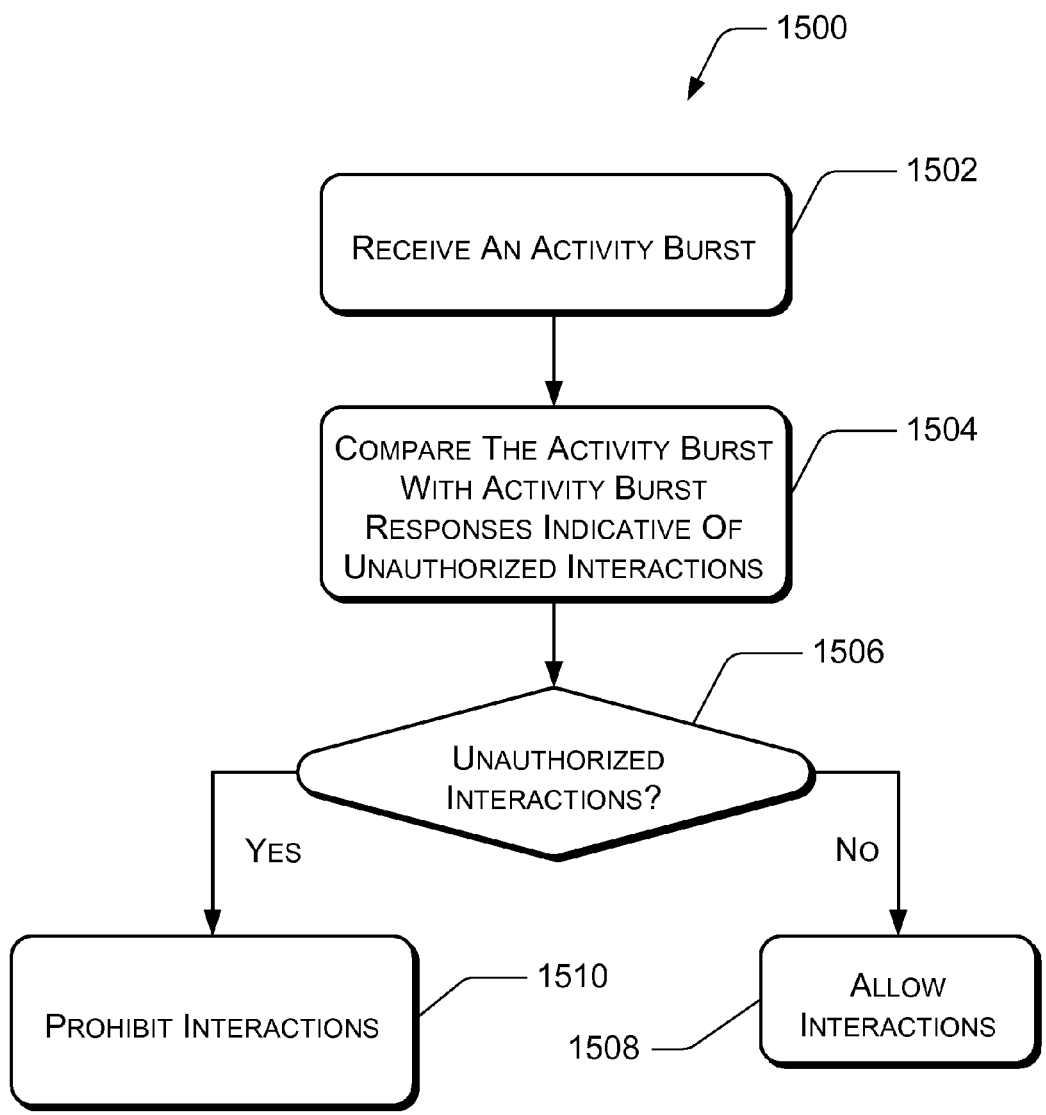
FIG. 15 illustrates exemplary method(s) for prohibiting the execution of unauthorized interactions.

FIG. 15 illustrates an exemplary method 1500 for prohibiting execution of unauthorized interactions—as defined by a system administrator, for example—on a computing-based device. Examples of unauthorized interactions include read and/or write actions performed on a file system by an entity or program not authorized to do such an action.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1502, an activity burst having a signature is received. For example, an activity burst 800 can be received dynamically from computing devices 102, 104(*a*)-(*n*). Activity bursts include activity responses corresponding to individual interactions that occur close together in time, within one or more threads. Individual activity responses in activity bursts correspond to a usage of resources, such as memory and processors, of a computing-based device in the execution of threads that result in interactions.

At block 1504, the signature of the activity burst is compared with signatures indicative of unauthorized interactions. For example, activity burst analyzing module 712 can compare the signature of the received activity burst with one or more forbidden action signatures in signed activity burst 718. Forbidden action signatures are indicative of unauthorized interactions forbidden by entities such as a system administrator, from taking place on computing devices 102, 104(*a*)-(*n*).

At block 1506, it is determined whether the activity burst corresponds to an unauthorized interaction. For example, if the signature of the activity burst does not correspond to a signature indicative of an unauthorized interaction ('no' path from block 1506), the interactions associated with the activity burst can be allowed to proceed (block 1508). Alternately, if the signature of the activity burst does correspond to a signature indicative of an unauthorized interaction ('yes' path from block 1506), the interactions associated with the activity burst are not allowed to proceed (block 1510).

In one exemplary implementation, activity burst analyzing module 712 can compare the signature of the activity burst with the forbidden action signatures in signed activity burst(s) 718, and determine whether the activity burst corresponds to an unauthorized action. If activity burst analyzing module 712 determines that the signature of the activity burst does not correspond to an unauthorized interaction, the interactions corresponding to the activity burst are allowed. Alternately, if activity burst analyzing module 712 determines that the signature of the activity burst corresponds to an unauthorized interaction, the interactions corresponding to the activity burst are prohibited. Prohibition can be implemented by entities such as a system administrator and activity burst analyzing module 712.

Figure 16:
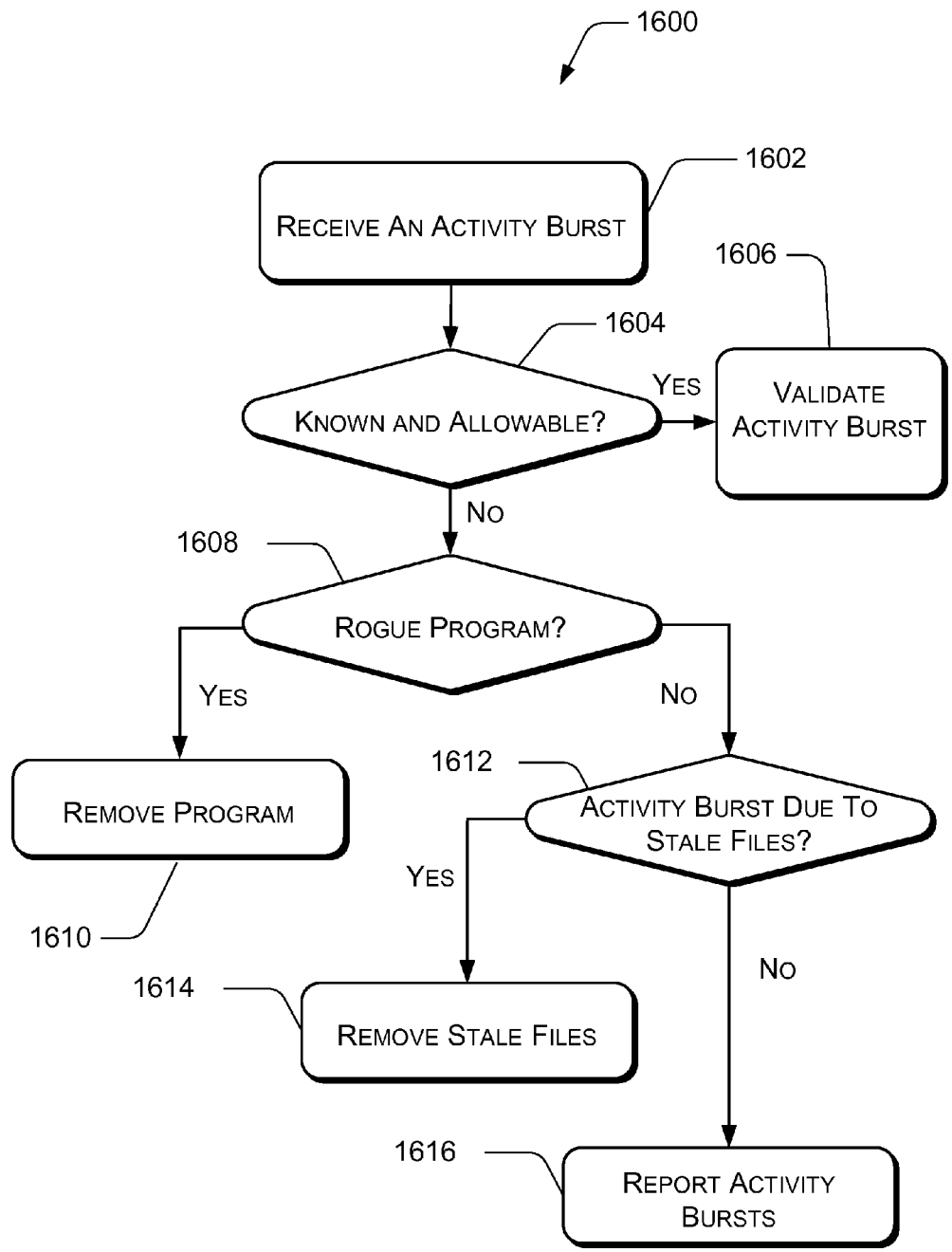
FIG. 16 illustrates exemplary method(s) for detecting rogue programs.

FIG. 16 illustrates an exemplary method 1600 for detecting rogue programs on one or more computing-based devices. Examples of rogue programs include spyware, malware, trojans, etc. and other programs that execute on a computing-based device causing undesirable or unwarranted activities. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1602, an activity burst having a signature is received. For example, an activity burst can be received by analyzing server 700 and can correspond to prior interactions received from an external storage device, such as collection server 106. Alternately, the activity burst can be received dynamically from computing devices 102, 104(*a*)-(*n*). Activity bursts include activity responses corresponding to individual interactions that occur close together in time, within one or more threads. Individual activity responses in activity bursts correspond to a usage of resources, such as memory and processors, of a computing-based device in the execution of threads that result in interactions.

At block 1604, the signature of the activity burst is compared with stored signatures associated with known and allowable activity bursts. For example, activity burst analyzing module 712 can compare the signature of the activity burst with one or more signatures associated with known and allowable activity bursts in signed activity burst(s) 718.

If the signature of the activity burst corresponds to a signature of a known and allowable activity burst ('yes' path from block 1604), then the activity burst is validated as being allowable, and interactions associated with the activity burst can be allowed to be executed (block 1606). For example, activity burst analyzing module 712, on determining that the signature of the activity burst is similar to a signature of a valid activity burst, can indicate that the activity burst is valid and can allow interactions associated with the activity burst to be executed.

Alternately, if the signature of the activity burst is not found to correspond to a signature associated with a known and allowable activity burst ('no' path from block 1604), a determination can be made whether the interaction is due to the activity of an unwarranted or rogue program (block 1608).

If the signature of the activity burst is similar to any signatures of known rogue activity bursts ('yes' path from block 1608), then a program associated with the interactions included in the activity burst can be deduced to be a rogue program and be removed (block 1610). Moreover, the interactions associated with the activity burst can be blocked from being executed.

For example, activity burst analyzing module 712 can compare the signature of the activity burst to signatures associated with activity bursts including interactions with rogue programs on computing-based devices 102, 104(*a*)-(*n*). If the signature of the activity burst is similar to any of the signatures associated with activity bursts including interactions with rogue programs on computing-based devices 102, 104(*a*)-(*n*), activity burst analyzing module 712 can identify the interactions associated with the activity burst as being due to one or more rogue programs. Entities including thread data recorder 108, activity burst analyzing module 712 and a system administrator, can remove the rogue program(s) and/or prohibit execution of threads associated with the activity burst.

Alternately, if the signature of the activity burst is not similar to any signatures of known rogue activity bursts ('no' path from block 1608), the activity burst can be examined to determine whether the activity burst is associated with one or more stale files (block 1612). If it is found that the activity burst is associated with stale files ('yes' path from block 1612) the stale files may be removed (block 1614). Alternately, if it is found that the activity burst is not associated with stale files ('no' path from block 1612), an entity such as a system administrator may be presented with a message reporting the existence of the activity burst (block 1616). Moreover, threads associated with the activity burst may be prohibited from being executed.

For example, if activity burst analyzing module 712 does not find the signature of the activity burst to be similar to any of the signatures associated with activity bursts including interactions with rogue programs on computing-based devices 102, 104(*a*)-(*n*), activity burst analyzing module 712 can check to see if the activity burst is due to interactions caused as a result of the execution of stale files. In one possible implementation, activity burst analyzing module 712 can compare the signature of the activity burst with signatures of activity bursts associated with the execution of stale files stored in signed activity burst(s) 718. If the signatures are similar, elements including thread data recorder 108, activity burst analyzing module 712 and a system administrator, can remove the stale files from computing-based device 102, 104(*a*)-(*n*).

Alternately, if the signature of the activity burst is not similar to signatures of activity bursts associated with the execution of stale files stored in signed activity burst(s) 718, activity burst analyzing module 712 can present an entity such as a system administrator with a message reporting the existence of the activity burst. Additionally, entities including thread data recorder 108, activity burst analyzing module 712 and a system administrator, can prohibit execution of the threads associated with the activity burst.

Exemplary Computer Environment

Figure 17:
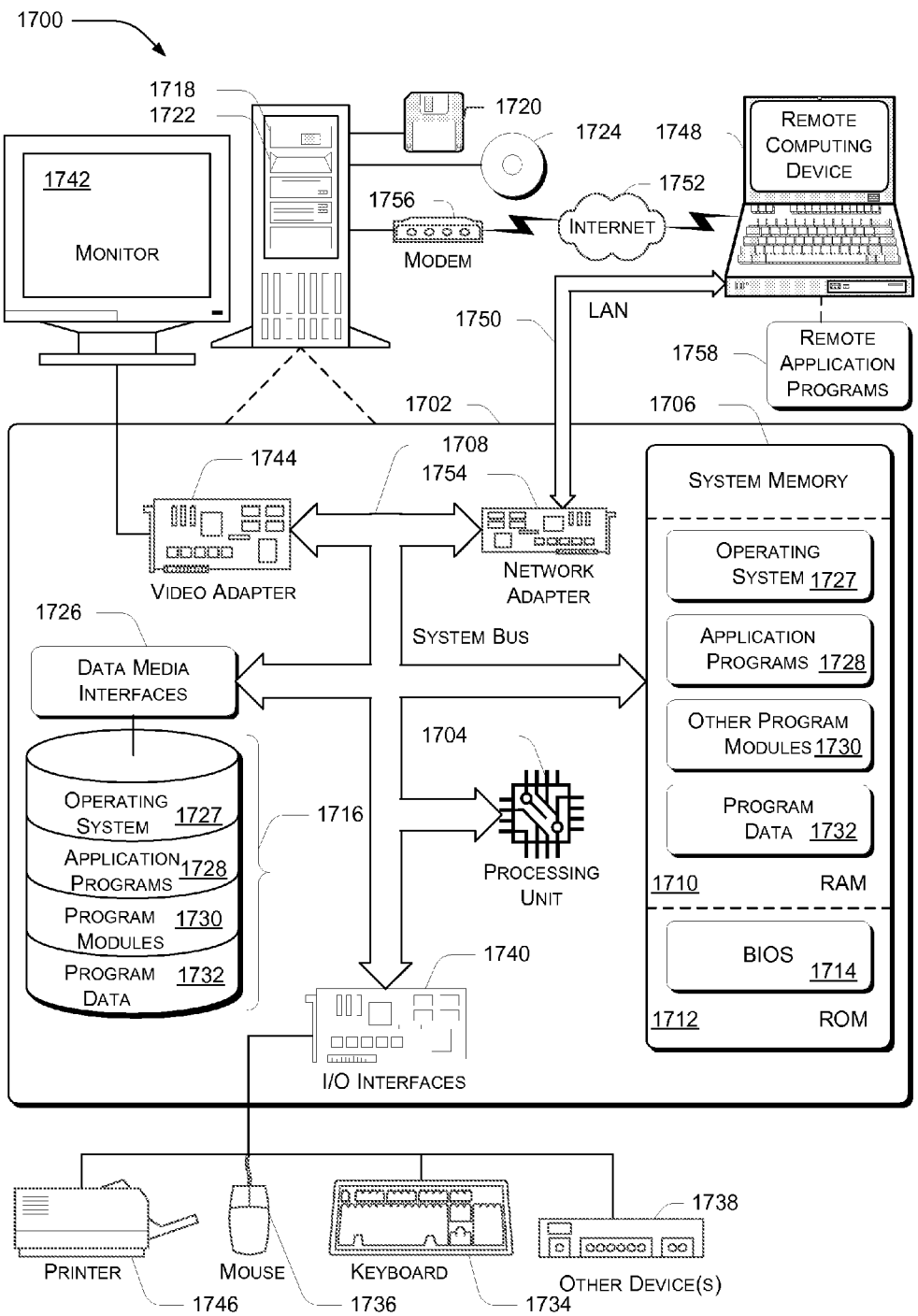
FIG. 17 illustrates an exemplary computer environment.

FIG. 17 illustrates an exemplary general computer environment 1700, which can be used to implement the techniques described herein, and which may be representative, in whole or in part, of elements described herein. The computer environment 1700 is only one example of a computing environment and is not intended to suggest any limitation as to the scope of use or functionality of the computer and network architectures. Neither should the computer environment 1700 be interpreted as having any dependency or requirement relating to any one or combination of components illustrated in the example computer environment 1700.

Computer environment 1700 includes a general-purpose computing-based device in the form of a computer 1702. Computer 1702 can be, for example, a desktop computer, a handheld computer, a notebook or laptop computer, a server computer, a game console, and so on. The components of computer 1702 can include, but are not limited to, one or more processors or processing units 1704, a system memory 1706, and a system bus 1708 that couples various system components including the processor 1704 to the system memory 1706.

The system bus 1708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1702 typically includes a variety of computer readable media. Such media can be any available media that is accessible by computer 1702 and includes both volatile and non-volatile media, removable and non-removable media.

The system memory 1706 includes computer readable media in the form of volatile memory, such as random access memory (RAM) 1710, and/or non-volatile memory, such as read only memory (ROM) 1712. A basic input/output system (BIOS) 1714, containing the basic routines that help to transfer information between elements within computer 1702, such as during start-up, is stored in ROM 1712. RAM 1710 typically contains data and/or program modules that are immediately accessible to and/or presently operated on by the processing unit 1704.

Computer 1702 may also include other removable/non-removable, volatile/non-volatile computer storage media. By way of example, FIG. 17 illustrates a hard disk drive 1716 for reading from and writing to a non-removable, non-volatile magnetic media (not shown), a magnetic disk drive 1718 for reading from and writing to a removable, non-volatile magnetic disk 1720 (e.g., a "floppy disk"), and an optical disk drive 1722 for reading from and/or writing to a removable, non-volatile optical disk 1724 such as a CD-ROM, DVD-ROM, or other optical media. The hard disk drive 1716, magnetic disk drive 1718, and optical disk drive 1722 are each connected to the system bus 1708 by one or more data media interfaces 1726. Alternately, the hard disk drive 1716, magnetic disk drive 1718, and optical disk drive 1722 can be connected to the system bus 1708 by one or more interfaces (not shown).

The disk drives and their associated computer-readable media provide non-volatile storage of computer readable instructions, data structures, program modules, and other data for computer 1702. Although the example illustrates a hard disk 1716, a removable magnetic disk 1720, and a removable optical disk 1724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1716, magnetic disk 1720, optical disk 1724, ROM 1712, and/or RAM 1710, including by way of example, an operating system 1727, one or more application programs 1728, other program modules 1730, and program data 1732. Each of such operating system 1727, one or more application programs 1728, other program modules 1730, and program data 1732 (or some combination thereof) may implement all or part of the resident components that support the distributed file system.

A user can enter commands and information into computer 1702 via input devices such as a keyboard 1734 and a pointing device 1736 (e.g., a "mouse"). Other input devices 1738 (not shown specifically) may include a microphone, joystick, game pad, satellite dish, serial port, scanner, and/or the like. These and other input devices are connected to the processing unit 1504 via input/output interfaces 1740 that are coupled to the system bus 1708, but may be connected by other interface and bus structures, such as a parallel port, game port, or a universal serial bus (USB).

A monitor 1742 or other type of display device can also be connected to the system bus 1708 via an interface, such as a video adapter 1744. In addition to the monitor 1742, other output peripheral devices can include components such as speakers (not shown) and a printer 1746 which can be connected to computer 1702 via the input/output interfaces 1740.

Computer 1702 can operate in a networked environment using logical connections to one or more remote computers, such as a remote computing-based device 1748. By way of example, the remote computing-based device 1748 can be a personal computer, portable computer, a server, a router, a network computer, a peer device or other common network node, and the like. The remote computing-based device 1748 is illustrated as a portable computer that can include many or all of the elements and features described herein relative to computer 1702.

Logical connections between computer 1702 and the remote computer 1748 are depicted as a local area network (LAN) 1750 and a general wide area network (WAN) 1752. Such networking environments are commonplace in offices, enterprise-wide computer networks, intranets, and the Internet.

When implemented in a LAN networking environment, the computer 1702 is connected to a local network 1750 via a network interface or adapter 1754. When implemented in a WAN networking environment, the computer 1702 typically includes a modem 1756 or other means for establishing communications over the wide network 1752. The modem 1756, which can be internal or external to computer 1702, can be connected to the system bus 1708 via the input/output interfaces 1740 or other appropriate mechanisms. It is to be appreciated that the illustrated network connections are exemplary and that other means of establishing communication link(s) between the computers 1702 and 1748 can be employed.

In a networked environment, such as that illustrated with computing environment 1700, program modules depicted relative to the computer 1702, or portions thereof, may be stored in a remote memory storage device. By way of example, remote application programs 1758 reside on a memory device of remote computer 1748. For purposes of illustration, application programs and other executable program components such as the operating system are illustrated herein as discrete blocks, although it is recognized that such programs and components reside at various times in different storage components of the computing-based device 1702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments of thread interception and analysis have been described in language specific to structuiral features and/or methods, it is to be understood that the subject of the appended claims is not necessarily limited to the specific features or methods described. Rather, the specific features and methods are disclosed as exemplary implemenmtations of thread interception and analysis.

The invention claimed is:

1. A method executed on a computer, the method comprising:
    normalizing information associated with events corresponding to intercepted threads, the normalizing to include grouping together information associated with events corresponding to intercepted threads when the events are similar;
    adding the normalized information to preexisting categories of the normalized information; and
    merging the preexisting categories of the normalized information into an ordered event stream.

2. A method executed on a computer, the method comprising:
    normalizing information associated with events corresponding to intercepted threads, the normalizing to include grouping together information associated with event corresponding to intercepted threads when the threads are associated with one or more similar programs;
    adding the normalized information to preexisting categories of the normalized information; and
    merging the preexisting categories of the normalized information into an ordered event stream.

3. A method executed on a computer, the method comprising:
    normalizing information associated with events corresponding to intercepted threads, wherein the normalizing includes placing the information associated with the events corresponding to the intercepted threads into one or more categories comprising at least one of distinct file interactions, distinct registry interactions, process tables, or module tables;
    adding the normalized information to preexisting categories of the normalized information; and
    merging the preexisting categories of the normalized information into an ordered event stream.

4. A method of claim 3, wherein the distinct file interactions include information related to one or more interactions that occurred with a file system, associating with logged events that occur in the file system.

5. A method of claim 3, wherein the distinct registry interactions include information indicating additions or deletions to registry settings of computer-based applications running on a computing-based device.

6. A method of claim 3, wherein the process tables track processes, including a path to an executable that started a process, and a start time and an end time of the process.

7. A method of claim 3, wherein the process tables include at least one of a time of creation, a user context, an image name, a command line affecting the event, or information describing system context at a time of the event.

8. A method of claim 3, wherein the module tables define one or more settings associated with a program module resulting in an event in consideration.

9. A method of claim 3, wherein the module tables include at least one of a file name string stored in a string table, timestamp information, a user context, a reference to a thread for loading the program module, or a path to the program module.

10. A method executed on a computer, the method comprising:
 normalizing information associated with events corresponding to intercepted threads;
 adding the normalized information to preexisting categories of the normalized information;
 merging the preexisting categories of the normalized information into an ordered event stream;
 creating logs of data intercepted from threads;
 storing the data as information associated with events corresponding to the intercepted threads; and
 compressing the data intercepted from the threads.

11. A computer storage media including computer readable instructions executed on a computer, the computer storage media performing instructions comprising:
 normalizing information associated with events corresponding to intercepted threads, wherein the normalizing comprises placing the information associated with the events corresponding to the intercepted threads into one or more categories comprising at least one of distinct file interactions, distinct registry interactions, process tables, or module tables;
 adding the normalized information to preexisting categories of the normalized information; and
 merging the preexisting categories of the normalized information into an ordered event stream.

12. A computer storage media of claim 11, wherein the distinct file interactions include information related to one or more interactions that occurred with a file system, associated with logged events that occur in the file system.

13. A computer storage media of claim 11, wherein the distinct registry interactions include information indicating additions or deletions to registry settings of computer-based applications running on a computing-based device.

14. A computer storage media of claim 11, wherein the process tables track processes, including a path to an executable that started a process, and a start time and an end time of the process.

15. A computer storage media of claim 11, wherein the process tables include at least one of a time of creation, a user context, an image name, a command line affecting the event, or information describing system context at a time of the event.

16. A computer storage media of claim 11, wherein the module tables define one or more settings associated with a program module resulting in an event in consideration.

17. A computer storage media of claim 11, wherein the module tables include at least one of a file name string stored in a string table, timestamp information, a user context, a reference to a thread for loading the program module, or a path to the program module.

* * * * *